(12) United States Patent
Mounier et al.

(10) Patent No.: US 11,836,301 B2
(45) Date of Patent: Dec. 5, 2023

(54) ELECTRONIC DEVICE FOR TRACKING OBJECTS

(71) Applicant: QUALCOMM Incorporated, San Diego, CA (US)

(72) Inventors: Sebastien Mounier, San Diego, CA (US); Tom Edward Botterill, San Diego, CA (US); Jonathan Kies, Encinitas, CA (US); Ramesh Chandrasekhar, Oceanside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 17/398,991

(22) Filed: Aug. 10, 2021

(65) Prior Publication Data

US 2023/0048398 A1 Feb. 16, 2023

(51) Int. Cl.
| | |
|---|---|
| *G06F 3/0346* | (2013.01) |
| *H04N 23/61* | (2023.01) |
| *H04N 23/667* | (2023.01) |
| *H04N 23/65* | (2023.01) |
| *G06F 3/01* | (2006.01) |
| *G06F 3/04815* | (2022.01) |
| *G06T 7/20* | (2017.01) |
| *G06F 3/04845* | (2022.01) |
| *G06F 3/0485* | (2022.01) |

(52) U.S. Cl.
CPC ............ *G06F 3/0346* (2013.01); *G06F 3/014* (2013.01); *G06F 3/04815* (2013.01); *G06T 7/20* (2013.01); *H04N 23/61* (2023.01); *H04N 23/651* (2023.01); *H04N 23/667* (2023.01); *G06F 3/0485* (2013.01); *G06F 3/04845* (2013.01); *G06F 2203/0331* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 2014/0037135 | A1* | 2/2014 | Kutliroff | H04N 23/80 |
| | | | | 348/46 |
| 2018/0108145 | A1* | 4/2018 | Miura | H04N 13/344 |
| 2019/0318501 | A1 | 10/2019 | Balan et al. | |
| 2020/0108308 | A1* | 4/2020 | Shinoda | A63F 13/211 |
| 2020/0333876 | A1 | 10/2020 | Shipes et al. | |
| 2020/0372702 | A1* | 11/2020 | Yan | G06F 3/0346 |
| 2021/0239983 | A1* | 8/2021 | Song | G06F 3/0481 |
| 2022/0223017 | A1* | 7/2022 | Wong | G08B 13/19669 |

OTHER PUBLICATIONS

International Search Report and Written Opinion—PCT/US2022/074494—ISA/EPO—dated Nov. 11, 2022.

* cited by examiner

*Primary Examiner* — Amare Mengistu
*Assistant Examiner* — Sarvesh J Nadkarni
(74) *Attorney, Agent, or Firm* — QUALCOMM Incorporated

(57) ABSTRACT

Systems, methods, and non-transitory media are provided for tracking operations using data received from a wearable device. An example method can include determining a first position of a wearable device in a physical space; receiving, from the wearable device, position information associated with the wearable device; determining a second position of the wearable device based on the received position information; and tracking, based on the first position and the second position, a movement of the wearable device relative to an electronic device.

34 Claims, 8 Drawing Sheets

ELECTRONIC DEVICE FOR TRACKING OBJECTS

TECHNICAL FIELD

The present disclosure generally relates to tracking systems and, more specifically, an electronic device for tracking objects (e.g., for extended reality operations and/or power savings) using data from a wearable device.

BACKGROUND

Extended reality (e.g., augmented reality, virtual reality, etc.) devices, such as smart glasses and head-mounted displays (HMDs), generally implement cameras and sensors to track the position of the extended reality (XR) device and other objects within the physical environment. The XR reality devices can use the tracking information to provide a user of the XR device a realistic XR experience. For example, an XR device can allow a user to experience or interact with immersive virtual environments or content. To provide realistic XR experiences, XR technologies can integrate virtual content with the physical world, which can involve matching the relative pose and movement of objects and devices. The XR technologies can use tracking information to calculate the relative pose of devices, objects, and/or maps of the real-world environment in order to match the relative position and movement of the devices, objects, and/or the real-world environment, and anchor content to the real-world environment in a convincing manner. The relative pose information can be used to match virtual content with the user's perceived motion and the spatio-temporal state of the devices, objects, and real-world environment.

BRIEF SUMMARY

Disclosed are systems, methods, and computer-readable media for tracking objects and controlling operations, states, and/or settings of an electronic device. For example, an electronic device can use/leverage data from a wearable device to implement tracking, power savings, and/or various operations (e.g., extended reality operations, etc.). The electronic device can communicate with a wearable device to obtain data from the wearable device. In some examples, the wearable device can assist the electronic device with tracking, power savings, and/or other operations/settings. According to at least one example, a method is provided for tracking operations using data received from a wearable device. The method can include determining a first position of a wearable device in a physical space; receiving, from the wearable device, position information associated with the wearable device; determining a second position of the wearable device based on the received position information; and tracking, based on the first position and the second position, a movement of the wearable device relative to the electronic device.

According to at least one example, a non-transitory computer-readable medium is provided for tracking operations using data received from a wearable device. The non-transitory computer-readable medium can include instructions stored thereon which, when executed by one or more processors, cause the one or more processors to: determine a first position of a wearable device in a physical space; receive, from the wearable device, position information associated with the wearable device; determine a second position of the wearable device based on the received position information; and track, based on the first position and the second position, a movement of the wearable device relative to the electronic device.

According to at least one example, an apparatus is provided for tracking operations using data received from a wearable device. The apparatus can include memory and one or more processors coupled to the memory, the one or more processors being configured to: determine a first position of a wearable device in a physical space; receive, from the wearable device, position information associated with the wearable device; determine a second position of the wearable device based on the received position information; and track, based on the first position and the second position, a movement of the wearable device relative to the electronic device.

According to at least one example, another apparatus is provided for tracking operations using data received from a wearable device. The apparatus can include means for determining a first position of a wearable device in a physical space; receiving, from the wearable device, position information associated with the wearable device; determining a second position of the wearable device based on the received position information; and tracking, based on the first position and the second position, a movement of the wearable device relative to the electronic device.

In some aspects, the method, non-transitory computer-readable medium, and apparatuses described above can determine, based on the second position of the wearable device and/or the tracked movement of the wearable device, whether the wearable device is within a field-of-view (FOV) of one or more image sensors on the electronic device and/or visible to the one or more image sensors on the electronic device. In some aspects, the method, non-transitory computer-readable medium, and apparatuses described above can track, based on the second position of the wearable device and/or the tracked movement of the wearable device, a location of a hand associated with the wearable device. In some examples, the hand can include a hand wearing the wearable device (e.g., on a wrist, on a finger, etc.) or holding the wearable device.

In some examples, determining the first position of the wearable device can include receiving, from the wearable device, image data from one or more image sensors on the electronic device and/or data associated with one or more measurements from one or more sensors on the wearable device; and determining the first position of the wearable device based on the image data from the one or more image sensors and/or data associated with the one or more measurements from the one or more sensors.

In some examples, the data can include a distance of the wearable device relative to one or more objects (e.g., a wall, a door, furniture, a device, a person, an animal, etc.), a velocity vector indicating a velocity of movement of the wearable device, a touch signal measured by a touch sensor from the one or more sensors, audio data from an audio sensor from the one or more sensors, and/or an elevation of the wearable device in the physical space. In some cases, the one or more objects can include the electronic device, a body part (e.g., a hand, a leg, an arm, a head, a torso, etc.) associated with a user of the wearable device, and/or an input device (e.g., a controller, a keyboard, a remote, etc.).

In some examples, the position information can include a pose of the wearable device. In some cases, the position information can be based on sensor data from one or more sensors on the wearable device. In some cases, the position information can include a measurement from an inertial measurement unit from one or more sensors on the wearable device and/or an elevation measured by a pressure sensor from the one or more sensors.

In some cases, the second position can include a position of the wearable device relative to the electronic device. In some cases, the second position can include a position of the wearable device within a coordinate system, such as a coordinate system of the wearable device and/or a coordinate system of the electronic device.

In some aspects, tracking the movement of the wearable device can include determining the first position of the wearable device within a first coordinate system of the wearable device; transforming the first coordinate system of the wearable device to a second coordinate system of the electronic device; and determining the second position of the wearable device within the second coordinate system of the electronic device.

In some cases, the wearable device can include a bracelet, a ring, or a glove.

In some aspects, the method, non-transitory computer-readable medium, and apparatuses described above can capture, based on a determination that the wearable device is within the FOV of the one or more image sensors and/or visible to the one or more image sensors, one or more images of the hand via at least one image sensor from the one or more image sensors; and track the location of the hand based on the one or more images of the hand. In some examples, the location of the hand is tracked relative to a first coordinate system of the wearable device.

In some aspects, the method, non-transitory computer-readable medium, and apparatuses described above can determine, based on the position information, that the wearable device is outside of the FOV of the one or more image sensors and moving towards an area within the FOV of the one or more image sensors; and based on the determining that the wearable device is outside of the FOV of the one or more image sensors and moving towards the area within the FOV of the one or more image sensors, initiate one or more imaging operations and/or one or more tracking operations at the electronic device. In some examples, the one or more tracking operations can be at least partly based on image data from the one or more imaging operations.

In some aspects, the method, non-transitory computer-readable medium, and apparatuses described above can adjust, based on a first determination that the wearable device is within a first FOV of a first image sensor on the electronic device and/or a second determination that the wearable device is visible to the first image sensor on the electronic device, a first setting of the first image sensor. In some cases, the first setting can include a power mode of the first image sensor and/or an operating state of the first image sensor. In some aspects, the method, non-transitory computer-readable medium, and apparatuses described above can adjust, based on a third determination that the wearable device is outside of a second FOV of a second image sensor on the electronic device and/or a fourth determination that the wearable device is not visible to the second image sensor on the electronic device, a second setting of the second image sensor. In some examples, the second setting can include a power mode of the second image sensor and/or an operating state of the second image sensor.

In some examples, adjusting the first setting of the first image sensor can include changing the power mode of the first image sensor from a first power mode to a second power mode including a higher power mode than the first power mode and/or changing the operating state of the first image sensor from a first operating state to a second operating state including a higher operating state than the first operating state. In some examples, the second operating state can include a higher framerate and/or a higher resolution.

In some examples, adjusting the second setting of the second image sensor can include changing the power mode of the second image sensor from a first power mode to a second power mode including a lower power mode than the first power mode and/or changing the operating state of the second image sensor from a first operating state to a second operating state including a lower operating state than the first operating state. In some cases, the second operating state can include a lower framerate and/or a lower resolution.

In some aspects, the method, non-transitory computer-readable medium, and apparatuses described above can track, in response to a determination that the wearable device is outside of the FOV of the one or more image sensors on the electronic device and/or a view of the one or more image sensors to the wearable device is obstructed by one or more objects, a location of the wearable device based on additional position information from the wearable device. In some aspects, the method, non-transitory computer-readable medium, and apparatuses described above can track, in response to a determination that the wearable device is within the FOV of the one or more image sensors but a view of the one or more image sensors to the wearable device is obstructed, a location of the wearable device based on additional position information from the wearable device.

In some aspects, the method, non-transitory computer-readable medium, and apparatuses described above can initialize, in response to the determination that the wearable device is within the FOV of the one or more image sensors but the view of the one or more image sensors to the wearable device is obstructed, the one or more image sensors.

In some aspects, the method, non-transitory computer-readable medium, and apparatuses described above can receive, from the wearable device, an input configured to trigger a privacy mode at the electronic device; and based on the input configured to trigger the privacy mode, adjust an operating state of one or more image sensors at the electronic device to an off state and/or a disabled state. In some examples, the input can be based on sensor data from one or more sensors on the wearable device. In some cases, the sensor data can indicate a touch signal corresponding to a touch input at the wearable device, a location of the wearable device, and/or a distance between the wearable device and a body part of a user of the wearable device.

In some aspects, the method, non-transitory computer-readable medium, and apparatuses described above can receive, from the wearable device, an additional input configured to trigger the electronic device to stop the privacy mode. In some cases, the additional input can be based on sensor data indicating a touch signal corresponding to a touch input at the wearable device, a location of the wearable device corresponding to a location of a body part of a user of the wearable device, and/or a proximity between the wearable device and the body part.

In some aspects, the method, non-transitory computer-readable medium, and apparatuses described above can determine, based on data from the wearable device and/or a command from the wearable device, one or more extended reality (XR) inputs to an XR application on the electronic device. In some examples, the one or more XR inputs can include a modification of a virtual element along multiple dimensions in space, a selection of the virtual element, a navigation event, and/or a request to measure a distance defined by the first position of the wearable device, the second position of the wearable device, and/or the movement of the wearable device.

In some examples, the virtual element can include a virtual object rendered by the electronic device, a virtual plane in an environment rendered by the electronic device, and/or the environment rendered by the electronic device. In some examples, the navigation event can include scrolling rendered content and/or moving from a first interface element to a second interface element.

In some aspects, the method, non-transitory computer-readable medium, and apparatuses described above can receive, from the wearable device, an input configured to trigger an adjustment of one or more XR operations at the electronic device. In some examples, the one or more XR operations can include object detection, object classification, object tracking, pose estimation, and/or shape estimation. In some examples, the one or more sensors can include at least one of an accelerometer, a gyroscope, a pressure sensor, an audio sensor, a touch sensor, and a magnetometer.

In some aspects, the apparatuses described above can include one or more sensors. In some aspects, the apparatuses described above can include a wearable ring. In some aspects, an apparatus described above can include a mobile device. In some examples, the apparatuses can include a hand controller, a mobile phone, a wearable device, a display device, a mobile computer, a head-mounted device, and/or a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
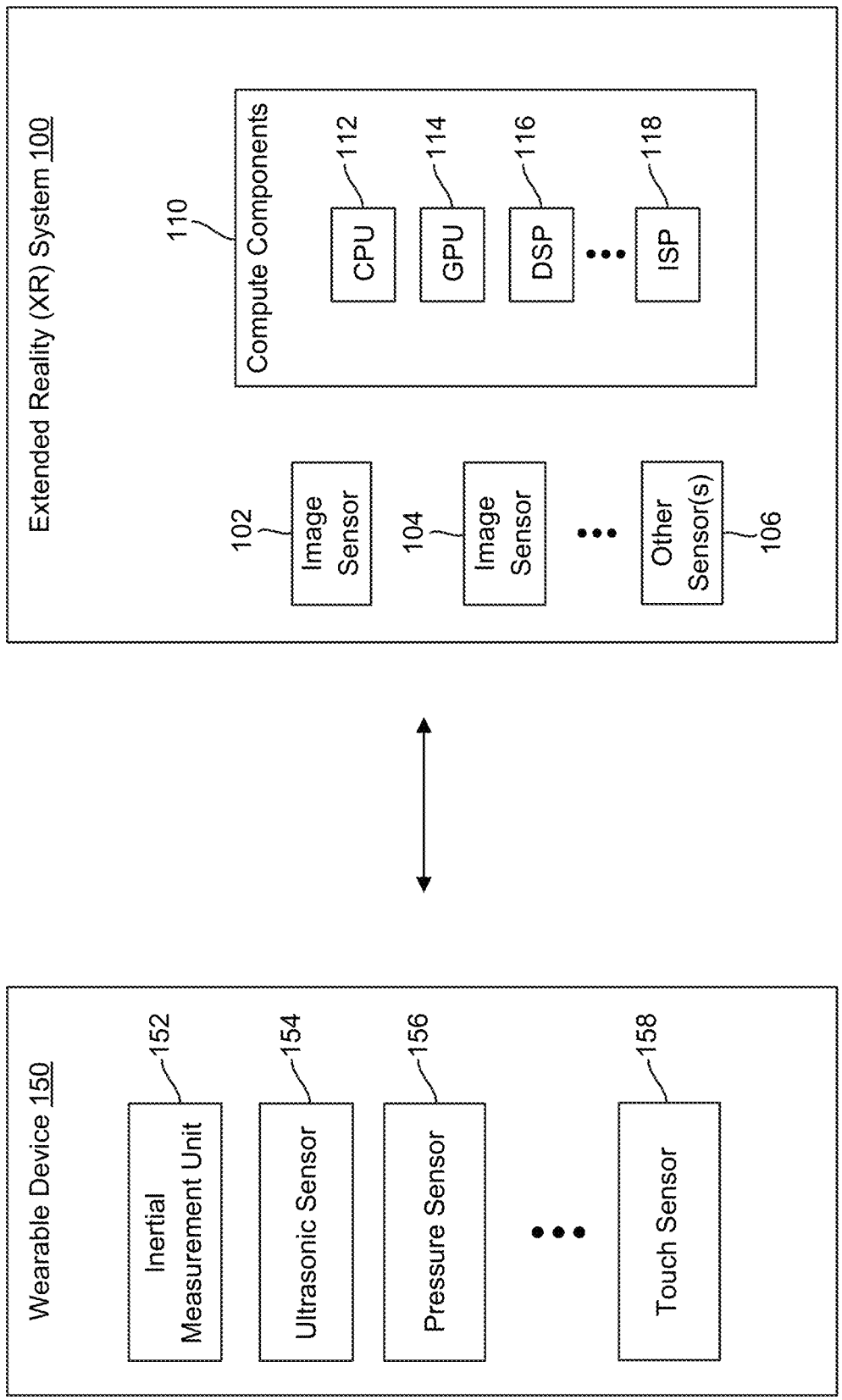
FIG. 1 is a diagram illustrating an example of an extended reality system and a wearable device used for extended reality experiences and functionalities, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously mentioned, extended reality (e.g., augmented reality, virtual reality, etc.) devices, such as smart glasses and head-mounted displays (HMDs), can implement cameras and sensors to track the position of the extended reality (XR) device and other objects within the physical environment. The XR reality devices can use such tracking information to provide a user of the XR device a realistic XR experience. For example, an XR device can allow a user to experience or interact with immersive virtual environments or content. To provide realistic XR experiences, XR technologies can integrate virtual content with the physical world. The XR technologies can use tracking information to calculate the relative pose of devices, objects, and/or maps of the real-world environment in order to match the relative position and movement of the devices, objects, and/or the real-world environment, and anchor content to the real-world environment in a convincing/realistic manner. The relative pose information can be used to match virtual content with the user's perceived motion and the spatio-temporal state of the devices, objects, and real-world environment.

In some examples, an XR device can implement a tracking algorithm that uses sensor data to track the position of an object in three-dimensional (3D) space, such as a hand, a finger, an input device (e.g., a controller, a stylus, a joystick, a glove, etc.). For example, a tracking algorithm can use measurements from various sensors, such as image sensors and inertial measurement units (IMUs), a pose of a controller (or data/measurements thereof), and/or a motion model for a user's hand(s) to estimate a hand/controller pose used by the XR device during an XR experience. In some cases, the tracking algorithm can use sensor data to predict the location of a user's hand(s), a location of a camera of the XR device, and/or a state of the XR device. The XR device can measure the location of the XR device, camera, and/or user's hand(s), and use such measurement to update the state of the XR device.

Often, an XR device may implement multiple cameras for tracking robustness. For example, an XR device can implement multiple cameras to track a full range of motion (e.g., up, down, left, right, etc.) of a hand (and/or any other object). Together, the multiple cameras can provide a full or larger field-of-view (FOV) in 3D space to capture (and track) an object from different relative positions in 3D space. While the multiple cameras implemented by the XR device and the tracking, detection, classification, etc., operations performed by the XR device can significantly aid in tracking, detection, and classification operations, they also use a significant amount of power and compute resources at the XR device. This can negatively impact the performance and the more-limited battery life of the XR device.

In some cases, the cameras used by XR devices can also create privacy issues. For example, in some situations, a user of an XR device may not want cameras on the XR device to capture images in a particular scene/setting or to even be turned on. In such cases, the user may want to turn off or disable the use of cameras at the XR device. However, turning off or disabling the use of cameras at the XR device can significantly limit the XR device's ability to track/detect objects or even prevent the XR device from tracking/detecting objects, which can significantly impact or prevent XR functionalities/experiences at the XR device.

In some aspects, systems, apparatuses, processes (also referred to as methods), and computer-readable media (collectively referred to herein as "systems and techniques") are described herein for using a wearable accessory (or wearable device) that interfaces/interacts with an XR device to aid in tracking, provide power savings, and/or increase user privacy during XR experiences. In some examples, a wearable accessory can be worn by a user of an XR device during an XR experience. The wearable accessory can be worn on a user's finger (or multiple fingers), a wrist, an ankle, and/or any other body part. The wearable accessory can include embedded sensors configured to obtain measurements of a state (e.g., a position, movement, etc.) of the wearable accessory in 3D space, and thus the state of the body part on which the wearable accessory is worn (e.g., a finger, a hand, etc.). The wearable accessory can provide the measurements to the XR device, which can integrate with its tracking system for more robust tracking and accuracy.

The wearable accessory can include, for example and without limitation, a ring that can be worn on a finger, a sleeve of rings that can be worn on multiple fingers, a bracelet that can be worn on a wrist, a glove that can be worn on a hand, etc. For example, the wearable accessory can include a ring device worn on a user's finger. The ring device can include embedded sensors that capture tracking measurements (e.g., position measurements, motion measurements, etc.) of the ring device (and thus the position of the user's finger/hand). The ring device can send the tracking measurements to an XR device of the user, which can use the tracking measurements (with or without measurements separately obtained by the XR device) to track, detect, and/or classify the user's finger/hand. In some examples, the tracking measurements from the ring device can help the XR device to track the user's finger/hand even when the user's finger/hand is outside (or partially outside) of a FOV of one or more cameras at the XR device, when lighting conditions in the scene prevent or limit the ability of the XR device to detect and/or image the user's finger/hand, when a view of the one or more cameras to the user's finger/hand is occluded by something, etc.

In some cases, the wearable accessory can help reduce power consumption at the XR device by triggering the XR device to modify an operation of the cameras at the XR device and/or a tracking system used by the XR device. For example, if the wearable accessory is outside of a FOV of one or more cameras on the XR device or if a view of the one or more cameras to the wearable accessory is obstructed (e.g., by an object, poor lighting conditions, etc.), the XR device can use tracking measurements from the wearable accessory to reduce a processing mode of the one or more cameras (e.g., turn off the one or more cameras, reduce a framerate of the one or more cameras, reduce operations by the one or more cameras, and/or otherwise reduce power consumption by the one or more cameras) to avoid unnecessary use of and/or power consumption by the one or more cameras. The XR device can use the tracking measurements to track the wearable accessory and/or aid in tracking the wearable accessory while the one or more cameras are in the reduced processing mode. In some examples, the XR device can use the tracking measurements to track the wearable accessory with or without other sensor data such as, for example, image data from the one or more cameras in the reduced processing mode and/or image data from one or more other cameras of the XR device.

To illustrate, if in a non-limiting example the XR device implements 4 cameras and the wearable accessory is outside of the FOV of 3 of the cameras, in order to reduce power consumption, the XR device can turn off (or otherwise reduce a processing mode of) the 3 cameras while such cameras are unable to capture tracking images of the wearable accessory (and the ring/hand or other body part wearing the wearable accessory). The XR device can use image data from the remaining camera and tracking measurements from the wearable accessory to track, detect, and/or classify user's hand/finger wearing the wearable accessory (or any other body part wearing the wearable accessory), while the other 3 cameras are turned off (or in a particular reduced processing mode). The tracking measurements from the wearable accessory can help increase the tracking fidelity/accuracy of the XR device, and can trigger subsequent processing mode adjustments of any of the cameras of the XR device based on a position and/or motion of the wearable accessory. If all 4 cameras of the XR device are unable to capture an image of the wearable accessory, the XR device can use the tracking measurements from the wearable accessory to continue tracking the wearable accessory (and the body part(s) on which it is worn). The number of cameras (e.g., 4) in this example is merely one illustrative example provided for explanation purposes and should not be construed as limiting. One of ordinary skill in the art will recognize from this disclosure that, in other examples, the XR device can implement any other number of cameras.

In some examples, the XR device can use the tracking measurements from the wearable accessory to determine where the wearable accessory (and the body part(s) wearing the wearable accessory) are and/or will be located and reduce a processing mode (e.g., turn off, reduce a framerate, etc.) of a camera(s) when the wearable accessory is outside of a coverage area of the camera(s) for a certain period of time. The tracking measurements from the wearable accessory can also trigger reactivation and/or a higher/full processing mode of the camera(s) when the wearable accessory is again within the coverage area of the camera(s).

In some cases, the tracking measurements from the wearable accessory can help the XR device track the wearable accessory and detect a hand wearing the wearable accessory (or any other body part) during difficult imaging conditions such as poor lighting conditions, cluttered backgrounds, etc. In some examples, the tracking measurements from the wearable accessory can help the XR device distinguish between different objects in a scene. For example, tracking measurements from a wearable accessory worn on a finger can help the XR device distinguish between the hand of the finger wearing the wearable accessory and other hands in the scene. To illustrate, the tracking measurements from the wearable accessory can provide the XR device a reference of which hand to track. The XR device can use this information to track the hand of the finger wearing the wearable accessory as the XR device can determine which of various hands in the scene is the hand intended to be tracked.

In some cases, the XR device can use one or more tracking measurements from the wearable accessory to distinguish an object of interest (e.g., a hand, a finger, etc.) associated with the wearable accessory from other objects (e.g., different body parts, devices, people, etc.) to allow the XR device to detect and track the object of interest (or the correct object). In some cases, the wearable accessory can send one or more signals to the XR device with a certain frequency pattern. The frequency pattern can be associated with the wearable accessory and can be used by the XR device to recognize the wearable accessory and the object of interest associated with the wearable accessory. In some examples, the XR device can use the frequency pattern to distinguish the wearable accessory and the object of interest from other objects in an environment. In some cases, the wearable accessory can include one or more visual patterns that the XR device can detect from one or more images to recognize the wearable accessory in the environment.

In some cases, the tracking measurements from the wearable accessory can help the XR device save power by reducing tracking operations and/or optimizing tracking operations. For example, the wearable accessory can obtain tracking measurements and provide a velocity vector to a hand tracking engine of the XR device to the help predict where in an image captured by a camera(s) of the XR device to search for a hand associated with the wearable accessory. The velocity vector can also help reduce the power consumed by the XR device in searching for the hand in an image by reducing the search time and/or search field. For example, using the tracking measurements from the wearable accessory, the XR device can search for the hand in one or more areas of an image without searching the entire image. By reducing the search, the XR device can also reduce the power consumed by the tracking algorithm (and the efficiency of the tracking algorithm) in finding the hand within the image. The XR device can thus avoid searching unnecessary regions on the image.

In some examples, the tracking measurements from the wearable accessory can reduce a power consumption at the XR device by reducing and/or adjusting a tracking workflow implemented by the XR device. For example, the tracking measurements from the wearable accessory can indicate that a hand wearing the wearable accessory and tracked by the XR device is outside of the FOV of the cameras of the XR device. The XR device can stop certain tracking operations, such as hand detection and/or hand classification operations, while the wearable accessory and the hand are outside of the FOV of the cameras. In some examples, the XR device can reduce the number of tracking operations while the wearable accessory and the hand are outside of the FOV of the cameras. For example, when the wearable accessory and the hand are outside of the FOV of the cameras, rather than performing hand detection and/or hand classification operations on every image captured by any of the cameras, the XR device can perform the hand detection and/or hand classification operations every n number of images.

In some cases, the wearable accessory can provide tracking measurements to the XR device to allow the XR device to continue tracking the wearable accessory (and a body part wearing the wearable accessory) even if the user of the XR device turns off the camera(s) on the XR device for privacy. Moreover, the wearable accessory can also be used to trigger a privacy mode at the XR device to turn off the camera(s) on the XR device. For example, the user can remove the wearable accessory and/or provide an input to the wearable accessory (e.g., a touch input, a motion-based input, etc.) to trigger a privacy mode at the XR device. The XR device can interpret the removal of the wearable accessory and/or the input to the wearable accessory as an input request to trigger a privacy mode.

The wearable accessory can include one or more sensors to track a state of the wearable accessory such as, for example, a position, a motion, etc. For example, the wearable accessory can include an inertial measurement unit (IMU) that can integrate multi-axes, accelerometers, gyroscopes, and/or other sensors to provide the XR device an estimate of the pose of the wearable accessory (and thus a body part wearing the wearable accessory) in physical space. The wearable accessory can include one or more sensors such as ultrasonic sensors and/or microphones used for ranging of the wearable accessory (and the body part wearing the wearable accessory). In some examples, one or more ultrasonic sensors and/or microphones can help determine if the wearable device is close to another object(s), if a user's hands (or other body part) are closer together or farther apart, if any of the user's hands (or other body part) are close to one or more other objects, etc. In some examples, a barometric air pressure sensor in the wearable accessory can determine relative elevation changes associated with the wearable accessory. The wearable accessory can send measurements from one or more sensors to the XR device, which can use the sensor measurements as further described herein.

The present technologies will be described in the following disclosure as follows. The discussion begins with a description of example systems and techniques for using a wearable accessory with an XR device for tracking, privacy, and/or power savings, as illustrated in FIGS. 1 through 4. A description of an example process for using a wearable device with an XR device, as illustrated in FIG. 5, will then follow. The discussion concludes with a description of an example computing device architecture including example hardware components suitable for performing XR and associated operations, as illustrated in FIG. 6. The disclosure now turns to FIG. 1

FIG. 1 is a diagram illustrating an example of an XR system 100 and a wearable device 150 for XR experiences, in accordance with some examples of the present disclosure. The wearable device 150 can represent a wearable accessory used with the XR system 100 as further described herein. The wearable accessory can include, for example and without limitation, a ring, a bracelet, a ring sleeve, a glove, a watch, or any other wearable device.

The XR system 100 and the wearable device 150 can be communicatively coupled to provide various XR functionalities as described herein. The XR system 100 and the wearable device 150 can include separate devices used for XR experiences. In some examples, the XR system 100 can implement one or more XR applications such as, for example and without limitation, a video game application, a robotic application, an autonomous driving or navigation application, a productivity application, a social media application, a communications application, a media application, an electronic commerce application, and/or any other XR application.

In some examples, the XR system 100 can include an electronic device configured to use information about the relative pose of the XR system 100 and/or the wearable device 150 to provide one or more functionalities, such as XR functionalities (e.g., tracking, detection, classification, mapping, content rendering, etc.), gaming functionalities, autonomous driving or navigation functionalities, computer vision functionalities, robotic functions, etc. For example, in some cases, the XR system 100 can be an XR device (e.g., a head-mounted display, a heads-up display device, smart glasses, etc.) and the wearable device 150 can provide tracking measurements to the XR system 100 for use by the XR system 100 to aid tracking operations, reduce power usage, support privacy mode operations, etc., as further described herein.

In the illustrative example shown in FIG. 1, the XR system 100 can include one or more image sensors, such as image sensor 102 and image sensor 104, other sensors 106, and one or more compute components 110. The other sensors 106 can include, for example and without limitation, an inertial measurement unit (IMU), a radar, a light detection and ranging (LIDAR) sensor, an audio sensor, a position sensor, a pressure sensor, a gyroscope, an accelerometer, a microphone, and/or any other sensor. In some examples, the XR system 100 can include additional sensors and/or components such as, for example, a light-emitting diode (LED) device, a storage device, a cache, a communications interface, a display, a memory device, etc. An example architecture and example hardware components that can be implemented by the XR system 100 are further described below with respect to FIG. 6.

Moreover, in the illustrative example shown in FIG. 1, the wearable device 150 includes an IMU 152, an ultrasonic sensor, a pressure sensor 156 (e.g., a barometric air pressure sensor and/or any other pressure sensor), and a touch sensor 158 (or tactile sensor). The sensor devices shown in FIG. 1 are non-limiting examples provided for explanation purposes. In other examples, the wearable device 150 can include more or less sensors (of the same and/or different types) than shown in FIG. 1. Moreover, in some cases, the wearable device 150 can include other devices such as, for example, a microphone, a display component (e.g., light-emitting diode display component), etc.

The components shown in FIG. 1 with respect to the XR system 100 and the wearable device 150 are merely illustrative examples provided for explanation purposes. In other examples, the XR system 100 and/or the wearable device 150 can include more or less components than those shown in FIG. 1.

The XR system 100 can be part of, or implemented by, a single computing device or multiple computing devices. In some examples, the XR system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a gaming console, an XR device such as an HMD, a drone, a computer in a vehicle, an IoT (Internet-of-Things) device, a smart wearable device, or any other suitable electronic device(s). In some implementations, the image sensor 102, the image sensor 104, the one or more other sensors 106, and/or the one or more compute components 110 can be part of the same computing device.

For example, in some cases, the image sensor 102, the image sensor 104, the one or more other sensors 106, and/or the one or more compute components 110 can be integrated with or into a camera system, a smartphone, a laptop, a tablet computer, a smart wearable device, an XR device such as an HMD, an IoT device, a gaming system, and/or any other computing device. However, in other implementations, the image sensor 102, the image sensor 104, the one or more other sensors 106, and/or the one or more compute components 110 can be part of, or implemented by, two or more separate computing devices.

The one or more compute components 110 of the XR system 100 can include, for example and without limitation, a central processing unit (CPU) 112, a graphics processing unit (GPU) 114, a digital signal processor (DSP) 116, and/or an image signal processor (ISP) 118. In some examples, the XR system 100 can include other types of processors such as, for example, a computer vision (CV) processor, a neural network processor (NNP), an application-specific integrated circuit (ASIC), a field-programmable gate array (FPGA), etc. The XR system 100 can use the one or more compute components 110 to perform various computing operations such as, for example, extended reality operations (e.g., tracking, localization, object detection, classification, pose estimation, mapping, content anchoring, content rendering, etc.), image/video processing, graphics rendering, machine learning, data processing, modeling, calculations, and/or any other operations.

In some cases, the one or more compute components 110 can include other electronic circuits or hardware, computer software, firmware, or any combination thereof, to perform any of the various operations described herein. In some examples, the one or more compute components 110 can include more or less compute components than those shown in FIG. 1. Moreover, the CPU 112, the GPU 114, the DSP 116, and the ISP 118 are merely illustrative examples of compute components provided for explanation purposes.

The image sensor 102 and the image sensor 104 can include any image and/or video sensor or capturing device, such as a digital camera sensor, a video camera sensor, a smartphone camera sensor, an image/video capture device on an electronic apparatus such as a television or computer, a camera, etc. In some cases, the image sensor 102 and/or the image sensor 104 can be part of a camera or computing device such as a digital camera, a video camera, an IP camera, a smartphone, a smart television, a game system, etc. Moreover, in some cases, the image sensor 102 and/or the image sensor 104 can include multiple image sensors, such as rear and front sensor devices, and can be part of a dual-camera or other multi-camera assembly (e.g., including two camera, three cameras, four cameras, or other number of cameras).

In some examples, the image sensor 102 and/or the image sensor 104 can capture image data and generate frames based on the image data and/or provide the image data or frames to the one or more compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some examples, the one or more compute components 110 can perform XR processing operations based on data from the image sensor 102, the image sensor 104, the one or more other sensors 106, and/or the wearable device 150. For example, in some cases, the one or more compute components 110 can perform tracking, localization, object detection, object classification, pose estimation, shape estimation, mapping, content anchoring, content rendering, image processing, modeling, content generation, gesture detection, gesture recognition, and/or other operations based on data from the image sensor 102, the image sensor 104, the one or more other sensors 106, and/or the wearable device 150.

In some examples, the one or more compute components 110 can implement one or more algorithms for tracking and estimating a relative pose of the wearable device 150 and the XR system 100. In some cases, the one or more compute components 110 can receive image data captured by the image sensor 102 and/or the image sensor 104 and perform pose estimation based on the received image data to calculate a relative pose of the wearable device 150 and the XR system 100. Moreover, the one or more compute components 110 can receive sensor data (e.g., data from the IMU 152, the ultrasonic sensor 154, the pressure sensor 156, and/or the touch sensor 158) from the wearable device 150, and use such data to track the wearable device 150 (with or without other data from the image sensor 102, the image sensor 104, or the other sensor(s) 106), adjust processing/power operations, etc., as described herein. In some cases, the one or more compute components 110 can implement one or more computer vision models to calculate the relative pose of the wearable device 150 and the XR system 100.

In some cases, the one or more other sensors 106 can detect acceleration by the XR system 100 and generate acceleration measurements based on the detected acceleration. In some cases, the one or more other sensors 106 can additionally or alternatively detect and measure the orientation and angular velocity of the XR system 100. For example, the one or more other sensors 106 can measure the pitch, roll, and yaw of the XR system 100. In some examples, the XR system 100 can use measurements obtained by the one or more other sensors 106 to calculate the relative pose of the XR system 100. In some cases, the XR system 100 can additionally or alternatively use sensor data from the wearable device 150 to perform tracking, pose estimation, and/or other operations.

The wearable device 150 can use the IMU 152, the ultrasonic sensor 154, and/or the pressure sensor 156 to obtain tracking measurements for the wearable device 150. The tracking measurements can include, for example and without limitation, position measurements, velocity/motion measurements, range/distance measurements, elevation measurements, etc. The wearable device 150 can provide the tracking measurements to the XR system 100. In some cases, the wearable device 150 can use the touch sensor 158 to receive user inputs for the XR system 100, such as for example, touch inputs (e.g., tapping, squeezing, pressing, rubbing, touching, etc.). The wearable device 150 can provide one or more detected inputs to the XR system 100 to modify a content, operation, and/or behavior of the XR system 100.

In some examples, the XR system 100 can use measurements obtained by the IMU 152, the ultrasonic sensor 154, and/or the pressure sensor 156 to calculate (and/or to assist in calculating) the relative location, motion, and/or position of the wearable device 150. In some cases, the IMU 152 can detect acceleration by the wearable device 150 and generate acceleration measurements based on the detected acceleration. In some cases, the IMU 152 can additionally or alternatively detect and measure the orientation and angular velocity of the wearable device 150. For example, the IMU 152 can measure the pitch, roll, and yaw of the wearable device 150.

In some examples, the wearable device 150 can use the ultrasonic sensor 154 for ranging. For example, the ultrasonic sensor 154 can measure a distance of the wearable device 150 relative to the XR system 100 and/or another object such as, for example, another wearable device, a body part (e.g., a hand, etc.), a person, a wall, another device (e.g., a controller, a stylus, a joystick, a mouse, a display, etc.), and/or any other object. The pressure sensor 156 can detect pressure such as air pressure, and can determine relative elevation changes. The touch sensor 158 can measure physical forces or interactions with the wearable device 150, which can be interpreted as inputs to the XR system 100.

The wearable device 150 can include one or more wireless communication interfaces (not shown) for communicating with the XR system 100. In some examples, the one or more wireless communication interfaces can include a wireless transmitter, a wireless transceiver, or any other means for wireless communications and/or transmitting data. The one or more wireless communication interfaces can implement any wireless protocol and/or technology to communicate with the XR system 100, such as short-range wireless technologies (e.g., Bluetooth, etc.) for example. The wearable device 150 can use the one or more wireless communication interfaces to transmit sensor measurements and/or other XR inputs to the XR system 100, as further described herein.

While the XR system 100 and the wearable device 150 are shown to include certain components, one of ordinary skill will appreciate that the XR system 100 and the wearable device 150 can include more or fewer components than those shown in FIG. 1. For example, the XR system 100 and/or the wearable device 150 can also include, in some instances, one or more other memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 1. An illustrative example of a computing device and/or hardware components that can be implemented with the XR system 100 and/or the wearable device 150 described below with respect to FIG. 6.

Figure 2A:
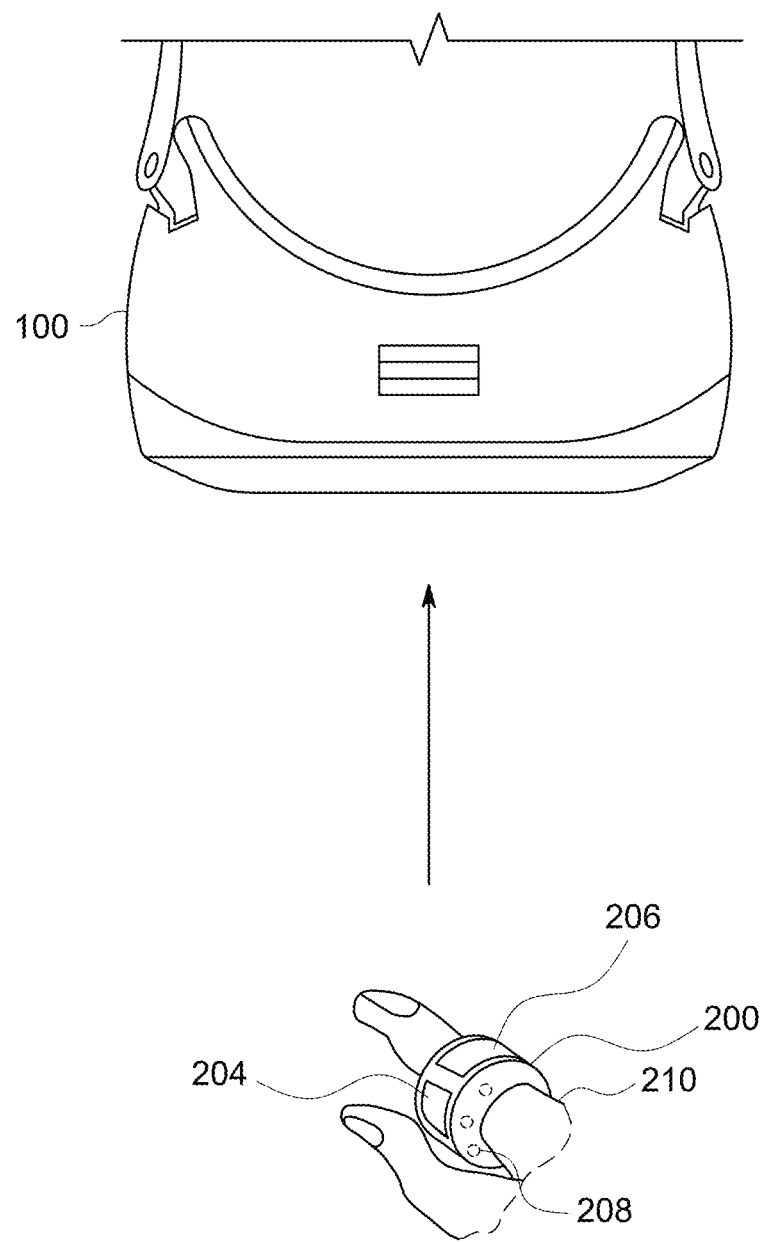
FIGS. 2A and 2B illustrates examples of a ring device worn on a finger of a user interacting with an extended reality system, in accordance with some examples of the present disclosure.
Figure 2B:
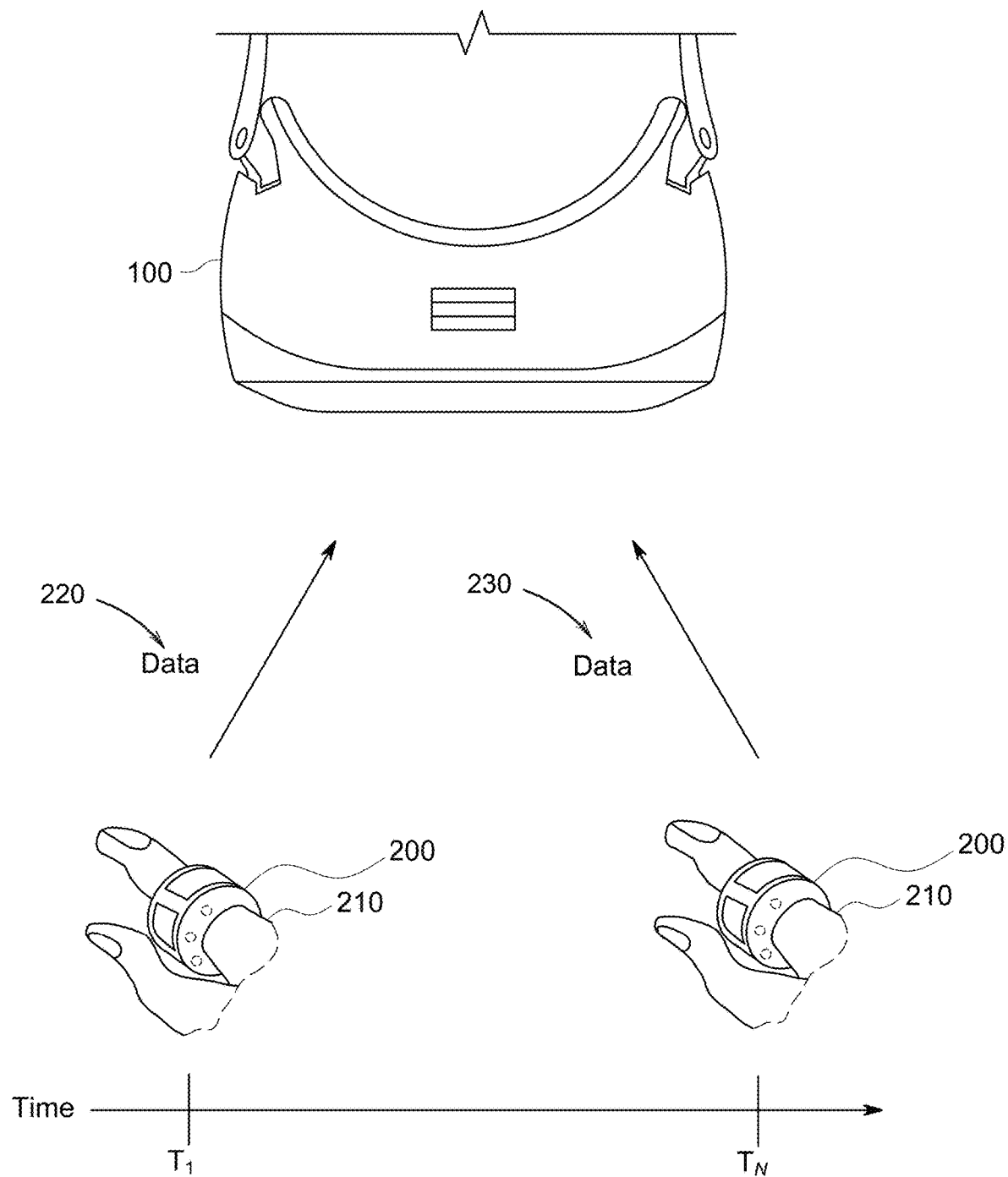

FIG. 2A illustrates an example of a ring device 200 worn on a finger 210 of a user interacting with the XR system 100. The ring device 200 can be an example of a wearable device, such as wearable device 150 shown in FIG. 1. For example, in some cases, the ring device 200 can be the same as the wearable device 150 shown in FIG. 1. In other cases, the ring device 200 can be a wearable device with a different form factor than the wearable device 150 shown in FIG. 1 and/or a different type of wearable device than the wearable device 150 shown in FIG. 1.

The user can use the ring device 200 to provide tracking measurements to the XR system 100, such as position measurements, distance measurements, elevation measurements, motion measurements, location measurements, etc. In some cases, the user can use the ring device 200 to interact with the XR system 100 and provide XR inputs. In some examples, the ring device 200 can collect sensor measurements to track a location, motion, pose, etc., of the ring device 200 in 3D space. In some examples, the location, motion, pose, etc., can be tracked relative to a location, motion, pose, etc., of the XR system 100 in 3D space. In some cases, the location, motion, pose, etc., can be tracked relative to a location, motion, pose, etc., of another object in 3D space, such as another wearable device, a person, a hand, a leg, a wall, an input device (e.g., a stylus, a controller, a mouse, etc.), an animal, a vehicle, etc.

In the example shown in FIG. 2A, the ring device 200 includes a touchpad 204 for receiving touch inputs, a display 206 for displaying information from the ring device 200 and/or the XR system 100, and sensors 208. However, in other cases, the ring device 200 can include more or less sensors/devices than shown in FIG. 2A. In some examples, the sensors 208 can include and/or can be the same as the IMU 152, the ultrasonic sensor 154, the pressure sensor 156, and/or the touch sensor 158 shown in FIG. 1. In other examples, the sensors 208 can include one or more sensors that are not shown in FIG. 1. In some cases, the ring device 200 can include a touch or pressure sensitive surface and/or surface portion for measuring touch inputs.

The XR system 100 can render content, interfaces, controls, etc., to a user wearing the XR system 100 and the ring device 200. The user can use the ring device 200 to wirelessly provide tracking measurements to the XR system 100 to assist the XR system 100 in tracking, detecting, classifying, mapping, etc., one or more objects associated with the ring device 200, such as the finger 210, a hand of the finger 210, the ring device 200, etc. In some examples, the user can use the ring device 200 to wirelessly adjust operations of the XR system 100; interact with XR content/interfaces/controls/etc., presented at the XR system 100; and/or provide XR inputs such as selections, object/environment manipulations, navigation inputs (e.g., scrolling, moving, etc.), gestures, etc.

The ring device 200 can be used to provide data to the XR system 100 to enhance tracking at the XR system 100, reduce power consumption at the XR system 100 when providing an XR experience, trigger a privacy mode (and a termination of a privacy mode) at the XR system 100, enhance XR functionalities, etc., as further described herein. For example, with reference to FIG. 2B, at time $T_1$, the ring device 200 can obtain data 220 based at least partly based on sensor data from one or more sensors (e.g., touchpad 204, sensors 208, etc.) on the ring device 200, and send the data 220 to the XR system 100. In some examples, the data 220 can include tracking measurements such as, for example, position measurements, distance measurements, elevation measurements, motion measurements, location measurements, etc. In some examples, the data 220 can include pose information associated with the ring device 200. For example, the data 220 can include a pose of the ring device 200 in physical space, a pose of the ring device 200 relative to the XR system 100, a pose of the ring device 200 in a coordinate system of the ring device 200, and/or a pose of the ring device 200 in a coordinate system of the XR system 100. In some examples, the data 220 can include command and/or input information. For example, in some cases, the data 220 can include one or more commands and/or inputs for triggering or stopping an operation at the XR system 100, triggering a setting and/or operation state/mode of the XR system 100, providing an input to an application on the XR system 100, and/or any other commands and/or inputs.

In some examples, the XR system 100 can use the data 220 to track the ring device 200 at $T_1$. In some cases, the XR system 100 can use the data 220 to estimate a position of the ring device 200 at one or more time steps after $T_1$. In some examples, the XR system 100 can use the data 220 to determine whether the finger 210 (and/or a hand of the finger 210) is visible to one or more image sensors (e.g., image sensor 102, image sensor 104) on the XR system 100. For example, the XR system 100 can use the data 220 to determine whether the finger 210 (and/or a hand of the finger 210) is within a FOV of one or more image sensors (e.g., image sensor 102, image sensor 104) on the XR system 100 and/or whether a view of the one or more image sensors to the finger 210 (and/or the hand of the finger 210) is obstructed by one or more objects. The XR system 100 can use this information to adjust device (e.g., image sensor) settings, XR operations, etc., as further described herein.

At time $T_n$, the ring device 200 can obtain data 230 based at least partly based on sensor data from the one or more sensors on the ring device 200, and send the data 230 to the XR system 100. The XR system 100 can use the data 230 to track the ring device 200 at $T_n$. In some cases, the XR system 100 can use the data 230 to estimate a position of the ring device 200 at one or more time steps after $T_n$. In some examples, the XR system 100 can use the data 230 to determine whether the finger 210 (and/or a hand of the finger 210) is visible to one or more image sensors on the XR system 100, as previously explained.

As previously mentioned, XR systems may track objects (e.g., hands, fingers, devices, etc.) based on image data received by cameras on the XR systems. However, persistently or periodically capturing and/or processing images can be costly. Moreover, in some cases, capturing and/or processing images can result in unnecessary usage of power resources. For example, an object of interest being tracked by an XR system may be occluded from a view of the camera(s) on the XR system, preventing the XR system from capturing the object of interest in an image obtained from the camera(s) on the XR system. As another example, there may be periods of time where a user may not intend to provide any input to the XR system 100 using the object of interest (or at all), there may be spaces where camera imaging is not permitted or the lighting conditions are poor, etc.

In some examples, data from the wearable device 150 can be used to help the XR system 100 in tracking an object of interest, save power at the XR system 100, control one or more operations/modes at the XR system 100, etc. For example, the wearable device 150 can receive signals from the wearable device 150 to inform a tracking engine in the XR system 100. In some cases, the signals can include data from and/or data based on sensor data from sensors embedded in the wearable device 150. The XR system 100 can use the signals from the wearable device 150 to track a body part (e.g., a finger, hand, wrist, group of fingers, etc.) wearing the wearable device 150 and correlate an estimated location of the body part with a FOV of any image sensors (e.g., image sensor 102, image sensor 104) on the XR system 100. In some examples, the XR system 100 can use this information to limit imaging to those image sensor(s) that can see the body part at a given time. In some cases, when the body part is not observable by an image sensor (e.g., the body part is outside of the FOV of the image sensor, the body part is occluded by one or more objects, the lighting conditions in the environment are poor or too dark, etc.), the XR system 100 can maintain tracking of the body part based on sensor signals from the wearable device 150 (e.g., position measurements, motion measurements, a pressure difference between the XR system 100 and the wearable device 150, location measurements, distance measurements, etc.).

In some cases, the XR system 100 can use the signals from the wearable device 150 to inform a visual object tracking engine at the XR system 100 when an object of interest commences a movement towards an observable FOV associated with one or more image sensors on the XR system 100. For example, the XR system 100 can use signals indicating a velocity of a hand moving into view to pre-seed the hand tracking. Moreover, the wearable device 150 and associated signals can help save power on the XR system 100 by limiting a use of one or more image sensors for tracking to instances where the object of interest is observable by the one or more image sensors. In some examples, a user experience can be improved by providing for observable gestures with an object (e.g., a hand, etc.) and/or gestures with an object (e.g., a hand, etc.) that is not in a FOV of the image sensor(s) on the XR system 100. The XR system 100 can improve a tracking robustness by combining signals from the wearable device 150 with image data from one or more image sensors on the XR system 100. In some cases, the signals from the wearable device 150 can be also be used to switch an operation/mode of the XR system 100 to a non-imaging mode (e.g., a private mode) in a private location (e.g., a restroom, locker room, an office, etc.) and/or during periods when the user wishes to maintain a privacy by preventing images from being captured.

Figure 3:
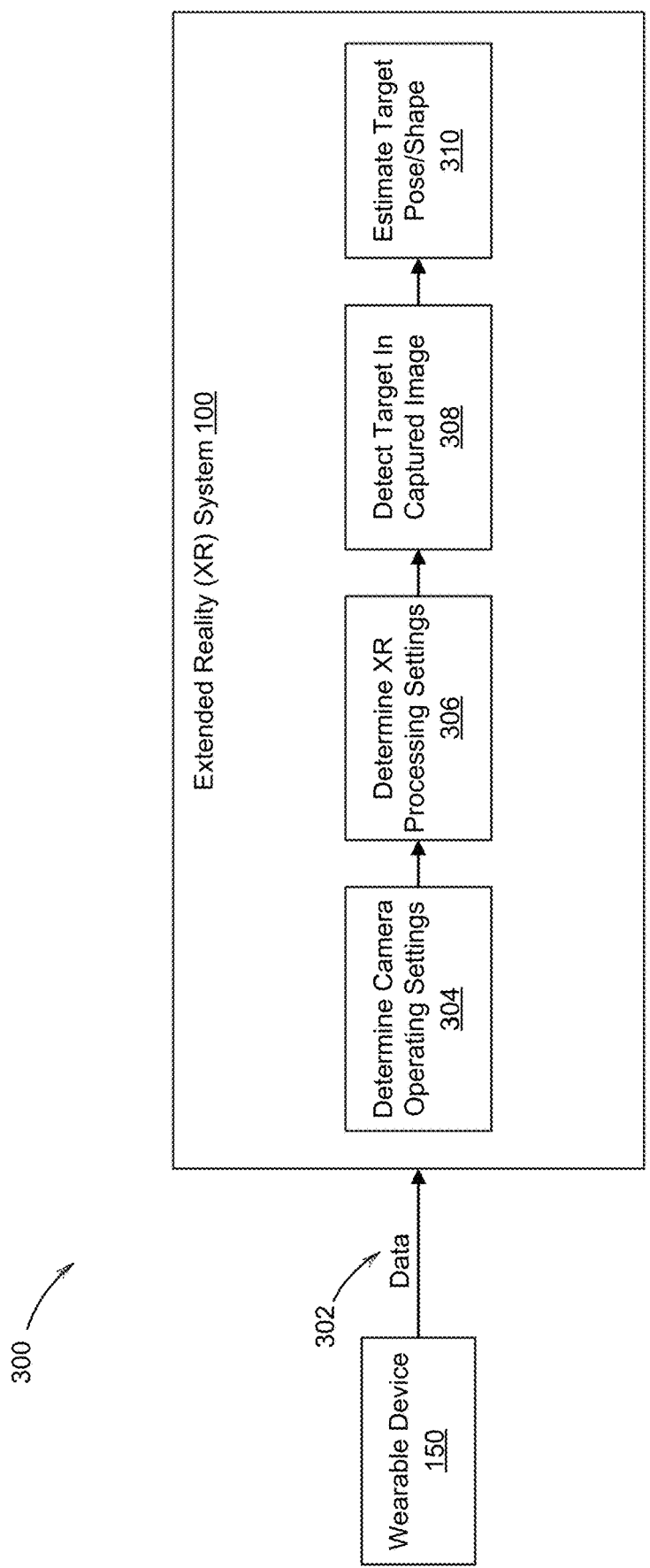
FIG. 3 is a diagram illustrating an example process for integrating data from a wearable device for extended reality operations at an extended reality system, in accordance with some examples of the present disclosure.

FIG. 3 is a diagram illustrating an example process 300 for integrating data from a wearable device 150 for XR operations at an XR system 100. The blocks, steps, and/or operations outlined in the example process 300 are illustrative examples and can be implemented in a different order and/or in any combination, including combinations that exclude, add, or modify certain blocks, steps, and/or operations.

In this example, the wearable device 150 can send data 302 to the XR system 100. The data 302 can include data calculated, measured, and/or collected by one or more sensors on the wearable device 150, such as IMU 152, ultrasonic sensor 154, pressure sensor 156, and/or touch sensor 158. In some cases, the data 302 can additionally or alternatively include can include data generated at least partly based on data calculated, measured, and/or collected by one or more sensors on the wearable device 150. In some cases, the wearable device 150 can obtain the data 302 while the wearable device 150 is worn by a user. For example, the wearable device 150 can obtain and send the data 302 while a user wears the wearable device 150 on a finger, wrist, or other body part. The data 302 can include, for example and without limitation, one or more position measurements, distance measurements, elevation measurements, location measurements, motion measurements, commands, inputs, pose information, etc.

At block 304, the XR system 100 can use the data 302 to determine camera (e.g., image sensor 102, image sensor 104) operating settings. The XR system 100 can adjust the camera operating settings to balance a power consumption of the image sensor(s) at the XR system 100 with the ability of the image sensor(s) to capture an image(s) (or a threshold quality/resolution image) of the wearable device 150 and/or a target associated with the wearable device 150 such as a hand, a finger, etc. For example, the XR system 100 can adjust camera operating settings to reduce power consumption by image sensors at the XR system 100 when such image sensors are unable to capture an image of the wearable device 150 (or an image with a threshold quality) and/or the target associated with the wearable device 150, and increase or maintain a power consumption by the image sensors when the image sensors are able to capture an image of the wearable device 150 and/or the target associated with the wearable device 150.

The camera operating settings can include, for example, a power state (e.g., turned off, turned on, a higher power state, a lower/reduced power state, etc.) of one or more image sensors at the XR system 100, a setting (e.g., a framerate, a resolution, etc.) of one or more image sensors, an active/inactive state of one or more image sensors, XR operations enabled/implemented by one or more image sensors, camera hardware used by one or more image sensors, and/or any other state or configuration of one or more image sensors and/or associated hardware. In some examples, the XR system 100 can determine the camera operating settings based on a position, motion, location, and/or state of the wearable device 150, as determined based on the data 302.

For example, if the XR system 100 determines (e.g., at least partly based on the data 302) that the wearable device 150 is outside of a FOV of one or more image sensors on the XR system 100 or a view of the one or more image sensors to the wearable device 150 is obstructed (e.g., by an object, poor lighting conditions, background cluttering, etc.), the XR system 100 can turn off/disable the one or more image sensors, reduce a framerate of the one or more image sensors, reduce a resolution of the one or more image sensors, reduce operations of the one or more image sensors, and/or otherwise reduce a power consumption or state of the one or more image sensors, to avoid unnecessary use of and/or power consumption by the one or more image sensors while the one or more image sensors are unable to capture an image of the wearable device 150 (or an image from which the wearable device 150 can be detected).

As another example, if the XR system 100 determines (e.g., at least partly based on the data 302) that the wearable device 150 is visible to one or more image sensors on the XR system 100 (e.g., based on a FOV of the one or more image sensors, lighting conditions, etc.), the XR system 100 can turn on/enable or maintain on the one or more image sensors, increase or maintain a certain framerate of the one or more image sensors, increase or maintain a resolution of the one or more image sensors, increase or maintain certain operations of the one or more image sensors, and/or otherwise increase or maintain a power consumption or state of the one or more image sensors. This can allow the XR system 100 to capture an image(s), a higher quality image (s), a higher rate of consecutive images, etc., for use in one or more XR operations such as, for example, tracking, object detection, classification, mapping, etc.

In some cases, if all the image sensors at the XR system 100 are turned off/disabled (and/or the wearable device 150 is not visible to any of the image sensors at the XR system 100), the XR system 100 can use the data 302 to track the wearable device 150 and/or a target associated with the wearable device 150, until the wearable device 150 and/or the target is/are visible to one or more image sensors at the XR system 100. In some cases, the XR system 100 can turn on or enable an image sensor when the wearable device 150 and/or the target becomes visible to the image sensor (e.g., as determined based on sensor data from the wearable device 150) or approaches (or is within) a threshold distance from a FOV of the image sensor (e.g., as determined based on sensor data from the wearable device 150).

In some cases, the XR system 100 can use the sensor data from the wearable device 150 to determine a trajectory of the wearable device 150 (and/or the target associated with the wearable device 150) relative to the FOV of one or more image sensors on the XR system 100. In some examples, the XR system 100 can use this information to (increasingly) reduce or increase an operating state and/or setting of an image sensor as the wearable device 150 moves closer or farther from a FOV of the image sensor. For example, the XR system 100 can increasingly reduce a framerate, resolution, power state, etc., of an image sensor as the wearable device 150 moves farther from the FOV of the image sensor. Similarly, the XR system 100 can increase the framerate, resolution, power state, etc., of the image sensor as the wearable device 150 moves closer to the FOV of the image sensor.

In some cases, if an image sensor at the XR system 100 is turned on/enabled and the wearable device 150 (and/or a target associated with the wearable device 150) is visible to the such image sensor, the XR system 100 can use the image sensor to capture one or more images of the wearable device 150 (and/or a target associated with the wearable device 150), which the XR system 100 can use to track the wearable device 150 (and/or a target associated with the wearable device 150). The XR system 100 can also use the data 302 to aid in the tracking of the wearable device 150 (and/or a target associated with the wearable device 150), as the data 302 can provide additional and/or corroborating information about a position, location, motion, etc., of the wearable device 150, and/or can help increase a tracking fidelity/accuracy.

In some examples, depending on the view to the wearable device 150 of each image sensor at the XR system 100 (e.g., as determined at least partly based on the data 302), the XR system 100 can configure different image sensors in different operating modes. For example, if the wearable device 150 is within a FOV of an image sensor and outside of the FOV of a different image sensor, the XR system 100 can turn off/disable or reduce a setting of (e.g., a framerate, a resolution, etc.) the different image sensor that does not have a view to the wearable device 150. The XR system 100 can also maintain on/enabled and/or increase a setting of (e.g., a framerate, a resolution, etc.) of the image sensor that does have a view to the wearable device 150.

At block 306, the XR system 100 can use the data 302 to determine XR processing settings implemented by the XR system 100. The XR system 100 can adjust XR processing settings to balance power consumption at the XR system 100 with a potential performance (e.g., accuracy, etc.) and/or benefit of the XR processing settings. For example, the XR system 100 can adjust certain XR processing settings to reduce power consumption if the XR system 100 determines that a reduction in power consumption resulting from such adjustment outweighs a potential (if any) negative performance impact, and vice versa.

In some examples, the XR processing settings can define a tracking workflow and/or a frequency of one or more operations in a tracking workflow. For example, the XR processing settings can define which tracking, object detection, classification, etc., operations to be performed and/or a frequency of such operations. To illustrate, the data 302 may indicate that a hand (or a finger of a hand) wearing the wearable device 150 is outside of the FOV of the image sensor(s) of the XR system 100. The XR system 100 can thus stop certain tracking operations, such as hand detection and/or hand classification operations, while the wearable device 150 and the hand are outside of the FOV of the image sensor(s).

In some cases, the XR system 100 can save power by reducing the number and/or frequency of tracking operations while the wearable device 150 and the hand (or any other target) are outside of the FOV of the image sensor(s). For example, when the wearable device 150 and the hand are outside of the FOV of the image sensor(s), rather than performing hand detection and/or hand classification operations on every image captured by the image sensor(s), the XR system 100 can perform the hand detection and/or hand classification operations every n number of images captured by the image sensor(s).

At block 308, the XR system 100 can detect a target (e.g., the wearable device 150, a hand associated with the wearable device 150, a finger associated with the wearable device 150, etc.) in an image(s) captured by one or more image sensors of the XR system 100. The one or more image sensors of the XR system 100 can capture the image when the target is within a FOV of the one or more image sensors as determined at least partly based on the data 302. The XR system 100 can implement an object detection algorithm to detect the target in the image. In some examples, the XR system 100 can implement computer vision and/or machine learning to detect the target in the image. In some cases, the XR system 100 can use the data 302 and/or image data from one or more image sensors on the XR system 100 to detect and/or recognize a gesture of the target, modify content (e.g., virtual content, interfaces, controls, etc.) rendered by the XR system 100, generate inputs/interactions with content rendered by the XR system 100, etc.

In some cases, the XR system 100 can use the data 302 to reduce an amount of power used to detect the target in the image. For example, in some cases, the XR system 100 can use the data 302 to predict where in the image to search for the target. The XR system 100 can reduce the power consumed by the XR system 100 in searching for the target in the image by reducing the search time and/or search field. For example, using the data 302, the XR system 100 can search for the target in one or more regions of the image without searching the entire image. The data 302 can provide an indication of the location/position of the target, which the XR system 100 can use to determine which region(s) of the image to search. By reducing the search, the XR system 100 can reduce the power consumed by the tracking algorithm (and the efficiency of the tracking algorithm) in finding the target within the image. The XR system 100 can thus avoid searching unnecessary regions of the image.

At block 310, the XR system 100 can estimate a pose and/or shape of the target detected in the image(s). In some examples, the XR system 100 can implement a machine learning algorithm to estimate the pose and/or shape of the target detected in the image(s). For example, the XR system 100 can implement one or more neural networks to process the data 302 and/or the image(s) and determine a shape and/or pose of the target. In some cases, the XR system 100 can use the estimated pose and/or shape of the target for one or more XR operations such as, for example, tracking/localization, mapping, content anchoring, content rendering, etc.

Figure 4:
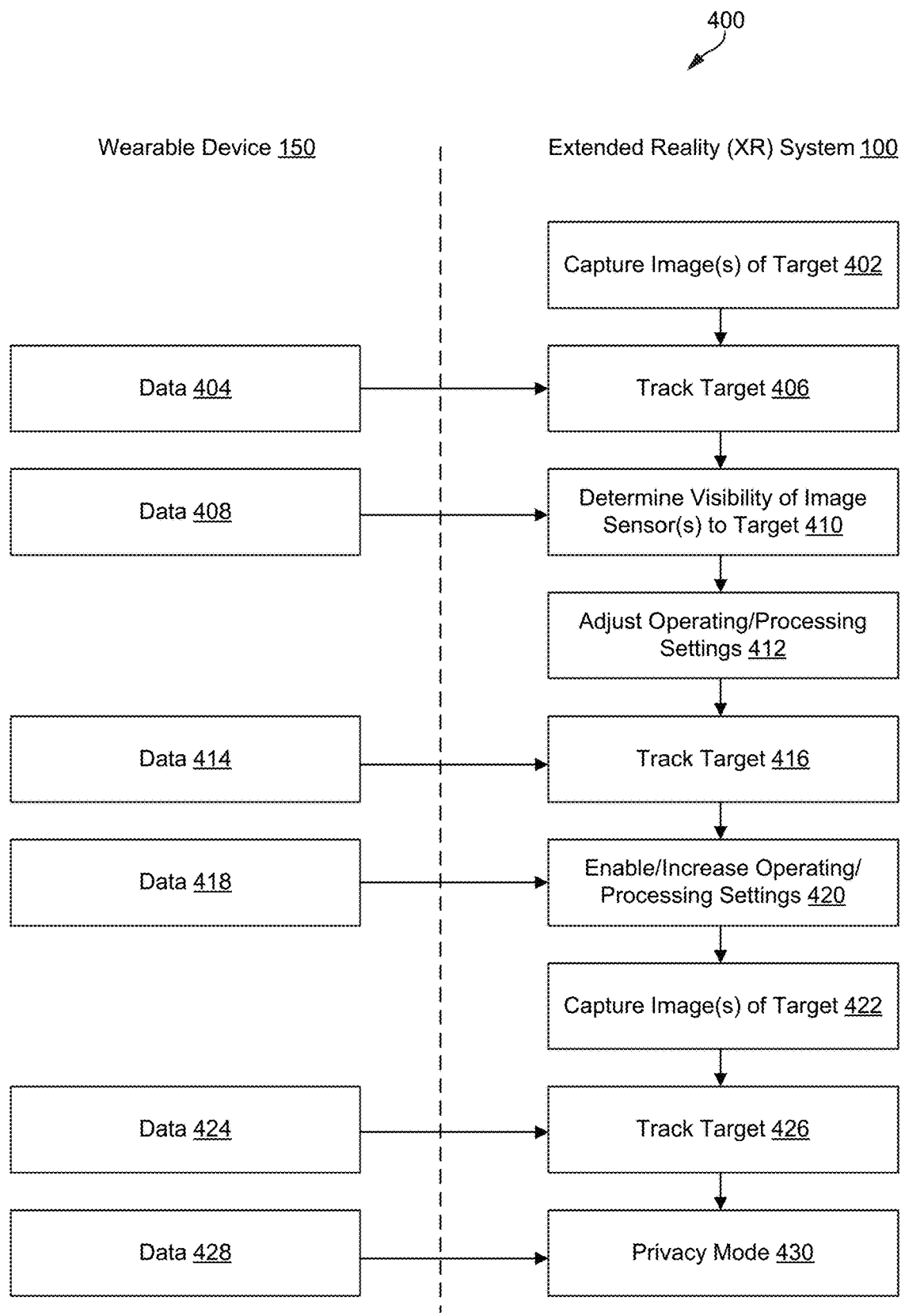
FIG. 4 is a flow diagram illustrating an example process for using a wearable device with an extended reality system (e.g., for enhanced tracking, power savings, and privacy functionalities), in accordance with some examples of the present disclosure.

FIG. 4 is a flow diagram illustrating an example process 400 for using a wearable device 150 with an XR system 100 for enhanced tracking, power savings, and privacy functionalities. The blocks/operations outlined in the example process 400 are illustrative examples and can be implemented in a different order and/or in any combination, including combinations that exclude, add, or modify certain blocks/operations.

In this example, at block 402, the XR system 100 can capture one or more images of a target associated with the wearable device 150. In some cases, the target can include, for example, a body part wearing the wearable device 150 or associated with another body part wearing the wearable device 150, such as a finger wearing the wearable device, a hand of the finger wearing the wearable device 150 (or wearing the wearable device 150), etc. In some cases, the target can include an object such as, for example, the wearable device 150, an input device (e.g., a controller, a stylus, a mouse, etc.), a person, an animal, a separate device (e.g., a robotic device, etc.), a vehicle, or any object.

At block 404, the wearable device 150 can send data to the XR system 100. The data can include data captured/measured by one or more sensors at the wearable device 150 such as, for example, position measurements, motion measurements, distance measurements, location measurements, elevation measurements, etc. In some cases, the data can additionally or alternatively include data generated at least partly based on data captured/measured by one or more sensors at the wearable device 150. In some examples, the data can include position information. For example, the data can include a pose of the wearable device 150. The pose can be, for example, a pose in physical space (e.g., in 3D space), a pose relative to the XR system 100, a pose within a coordinate system of the wearable device 150, a pose within a coordinate system of the XR system 100, any combination thereof, and/or any other pose. In some examples, the data can include one or more commands and/or inputs to the XR system 100, such as an application command/input, a command/input to apply one or more operating states/modes, one or more settings, one or more operations, etc.

At block 406, the XR system 100 can use the one or more images of the target and the data from the wearable device 150 to track the target. For example, the XR system 100 can detect a location of the target within the one or more images and use the location of the target within the one or more images to estimate a position of the target in 3D space. The XR system 100 can use the data to help detect the target within the one or more images and/or determine the position of the target within 3D space. In some examples, the XR system 100 can implement a computer vision algorithm and/or a machine learning (e.g., a neural network, etc.) algorithm to process the one or more images and the data to track the target.

At block 408, the wearable device 150 can send additional data to the XR system 100. At block 410, the XR system 100 can use the data to determine a visibility of one or more image sensors at the XR system 100 to the target. For example, the XR system 100 can use the data from the wearable device 150 to determine the position of the wearable device 150 and the target in 3D space. Based on the position of the target in 3D space, the XR system 100 can determine whether the target is within the FOV of any image sensor on the XR system 100. The XR system 100 can thus determine whether the target is outside or inside the FOV of any image sensor on the XR system 100.

At block 412, the XR system 100 can adjust operating and/or processing settings at the XR system 100 based on the position of the target relative to the FOV of each image sensor on the XR system 100. The operating and/or processing settings can include, for example and without limitation, camera device settings (e.g., framerate, resolution, power mode, resource use, state, etc.), XR processing or workflow settings, etc. In some examples, the XR processing or workflow settings can define specific XR operations to be implemented by the XR system 100 (e.g., object detection, object classification, pose estimation, shape estimation, mapping, gesture detection, gesture recognition, etc.), a frequency in which any particular XR operation is (or is not) implemented (e.g., based on units of time, number of frames processed, events, etc.), a setting of any particular XR operation implemented (e.g., a full implementation, a partial implementation, a coarse implementation, a sparse implementation, a fidelity, etc.), and/or any other processing setting.

For example, the XR system 100 can adjust an image sensor's settings to enable a use of the image sensor (e.g., turn on, enable, etc.) and/or increase a performance of the image sensor (e.g., increase a framerate, resolution, power mode, resource use, etc.) if the target is within the FOV (or nearing the FOV within a threshold proximity and/or estimated timeframe) of the image sensor, or disable a use of the image sensor (e.g., turn off, disable) and/or decrease a performance and/or power consumption of the image sensor (e.g., decrease a framerate, resolution, power mode, resource use, etc.) if the target is not within the FOV (or not nearing the FOV within a threshold proximity and/or estimated timeframe) of the image sensor. In some cases, the XR system 100 can implement different image sensor settings for some or all of the image sensors on the XR system 100. In other cases, the XR system 100 can implement the same image sensor settings for every image sensor on the XR system 100.

As another example, the XR system 100 can (additionally or alternatively) enable (or increase a performance/processing setting of) one or more operations such as object detection, object classification, pose estimation, shape estimation, etc., if the target is within the FOV (or nearing the FOV within a threshold proximity and/or estimated timeframe) of the image sensor, or disable (or decrease a performance/processing setting of) one or more operations such as object detection, object classification, pose estimation, shape estimation, etc., if the target is not within the FOV (or not nearing the FOV within a threshold proximity and/or estimated timeframe) of the image sensor.

At block 414, the wearable device 150 can send additional data to the XR system 100. At block 416, the XR system 100 can use the data from the wearable device 150 to track the target. If the target is not within the FOV of any image sensor on the XR system 100 and/or if the XR system 100 does not have an image capturing the wearable device 150 and/or target at a position associated with the data (or if the XR system 100 is unable to detect the target from any captured image), the XR system 100 can rely on the data from the wearable device 150 to track the target.

For example, if at block 412 the XR system 100 turns off or disables every image sensor at the XR system 100 (e.g., because the target is not within the FOV of any image sensor or not nearing the FOV within a threshold proximity and/or estimated timeframe), the XR system 100 may not have an image of the target at a current location of the target (or captured within a threshold time period). Accordingly, without an image of the target that the XR system 100 can use to track the target, the XR system 100 can rely on the data from the wearable device 150 to track the target until the XR system 100 is able to obtain an image of the target (or tracking is terminated).

On the other hand, if at block 412 the XR system 100 does not turn off or disable every image sensor at the XR system 100 and at least one image sensor is able to capture an image of the target, the XR system 100 can use the image of the target as well as the data from the wearable device 150 to track the target. In some examples, the XR system 100 can use the data along with the image of the target to determine a position of the target in 3D space. In some cases, the XR system 100 can use the data to help find the target in the image. For example, the XR system 100 can use the data to estimate what region(s) of the image contains the target and/or reduce what regions of the image it searches for the target. In some cases, by reducing the regions of the image searched (e.g., instead of searching the full image), the XR system 100 can reduce an amount of power consumed in searching the target in the image and/or increase an efficiency of finding the target in the image.

At block 418, the wearable device 150 can send additional data to the XR system 100. At block 420, the XR system 100 can enable or increase one or more operating/processing settings at the XR system 100 (e.g., image sensor settings, XR processing or workflow settings, etc.). For example, the data can trigger the XR system 100 to enable or increase one or more operating/processing settings previously disabled or decreased (e.g., at block 412). The XR system 100 can use the data from the wearable device 150 to determine a position of the target and determine whether to enable or increase any operating/processing settings based on the position of the target relative to the FOV of one or more image sensors on the XR system 100. In some examples, the XR system 100 can use the data to determine a visibility of each image sensor on the XR system 100 to the target, and enable or increase any operating/processing settings based on the visibility of each image sensor to the target.

For example, if the XR system 100 previously (e.g., at block 412) turned off or disabled an image sensor and subsequently determines (e.g., at block 420) that the target is within the FOV (or nearing the FOV within a threshold proximity and/or estimated timeframe) of the image sensor, the XR system 100 can turn on or enable that image sensor in order to capture an image(s) of the target using that image sensor. The XR system 100 can use such image of the target to track the target, detect the target, estimate a pose of the target, estimate a shape of the target, etc., as described herein. In some examples, if the XR system 100 previously (e.g., at block 412) turned off or disabled an image sensor and determines (e.g., at block 420) that the target is not (or is still not) within the FOV (or not nearing the FOV within a threshold proximity and/or estimated timeframe) of the image sensor, the XR system 100 can maintain that image sensor in the off or disabled state to conserve power.

At block 422, the XR system 100 can use one or more image sensors that are turned on/enabled to capture an image(s) of the target. The one or more image sensors can include any image sensor on the XR system 100 having visibility to the target. At block 424, the wearable device 150 can also send data to the XR system 100.

At block 426, the XR system 100 can use the image(s) of the target and the data from the wearable device 150 to track the target, as previously described.

At block 428, the wearable device 150 can send additional data to the XR system 100. At block 430, the data from the wearable device 150 can trigger a privacy mode at the XR system 100. The privacy mode can include turning off or disabling each image sensor on the XR system 100.

In some examples, the data that triggers the privacy mode can indicate a certain input (e.g., a touch input, a motion-based input, etc.) provided to the wearable device 150 and/or a certain state of the wearable device 150 (e.g., the wearable device 150 was removed from a finger, hand, or other body part; the wearable device 150 was placed on a surface; etc.). The XR system 100 can interpret the particular input and/or state indicated in the data as a request or an intent to enter/enable the privacy mode.

In some examples, the wearable device 150 can send additional data to the XR system 100 to trigger the XR system 100 to stop the privacy mode. For example, the wearable device 150 can send additional data indicating a certain input (e.g., a touch input, a motion-based input, etc.) and/or a certain state of the wearable device 150 (e.g., the wearable device 150 was placed on a finger, hand, or other body part), which the XR system 100 can interpret as a request or intent to stop the privacy mode. The XR system 100 can stop the privacy mode and return to previous operating/processing settings or use data from the wearable device 150 to determine operating/processing settings to implement after the privacy mode.

In some cases, when the XR system 100 is in privacy mode, the XR system 100 can use data provided by the wearable device 100 to provide some level of tracking of the target. For example, the wearable device 150 can send data to the XR system 100 while the XR system 100 is in privacy mode. The XR system 100 can use the data to track the target as previously explained.

Figure 5A:
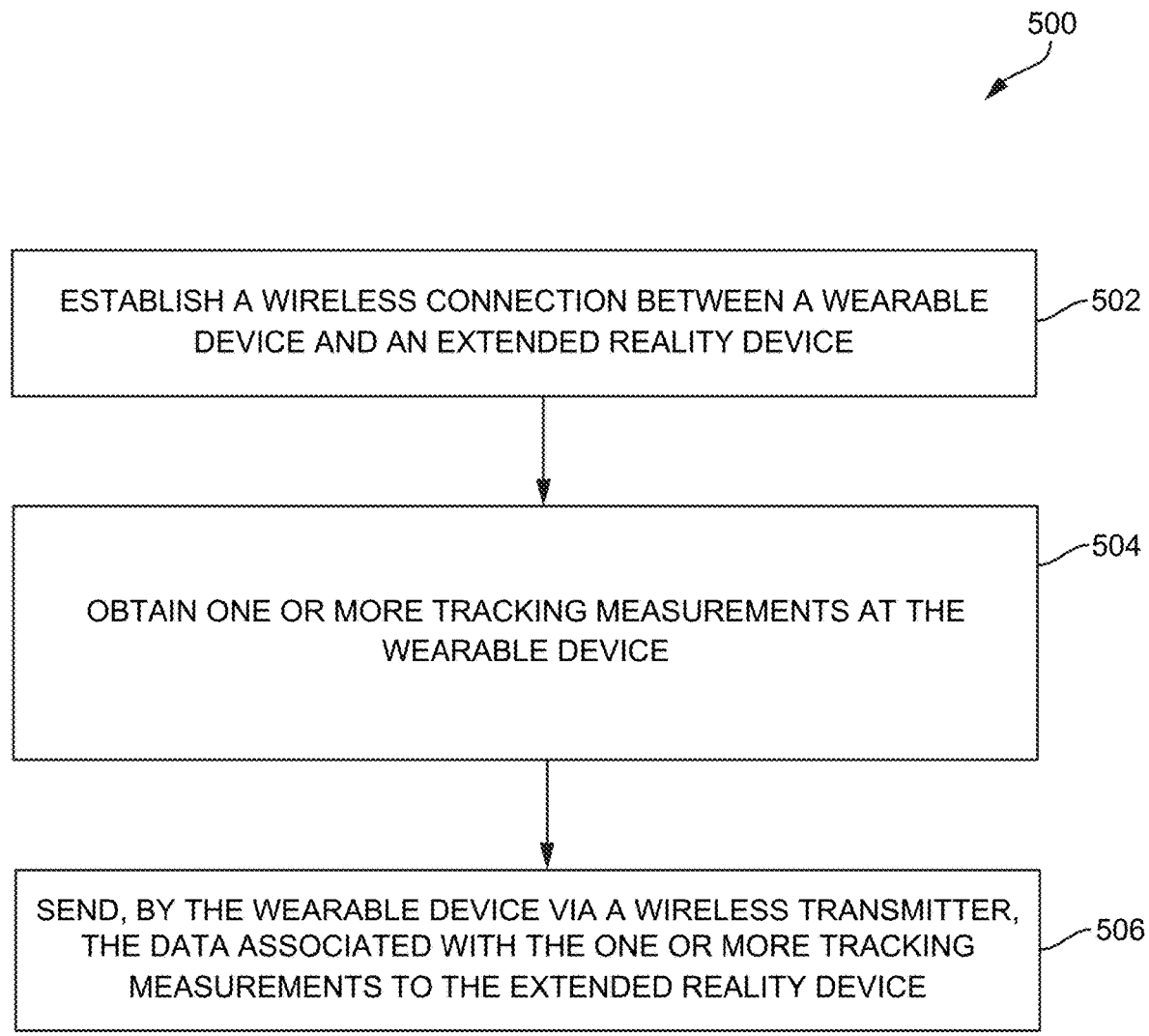
FIG. 5A is a flow diagram illustrating an example process for using a wearable device with an extended reality device, in accordance with some examples of the present disclosure.
Figure 6:
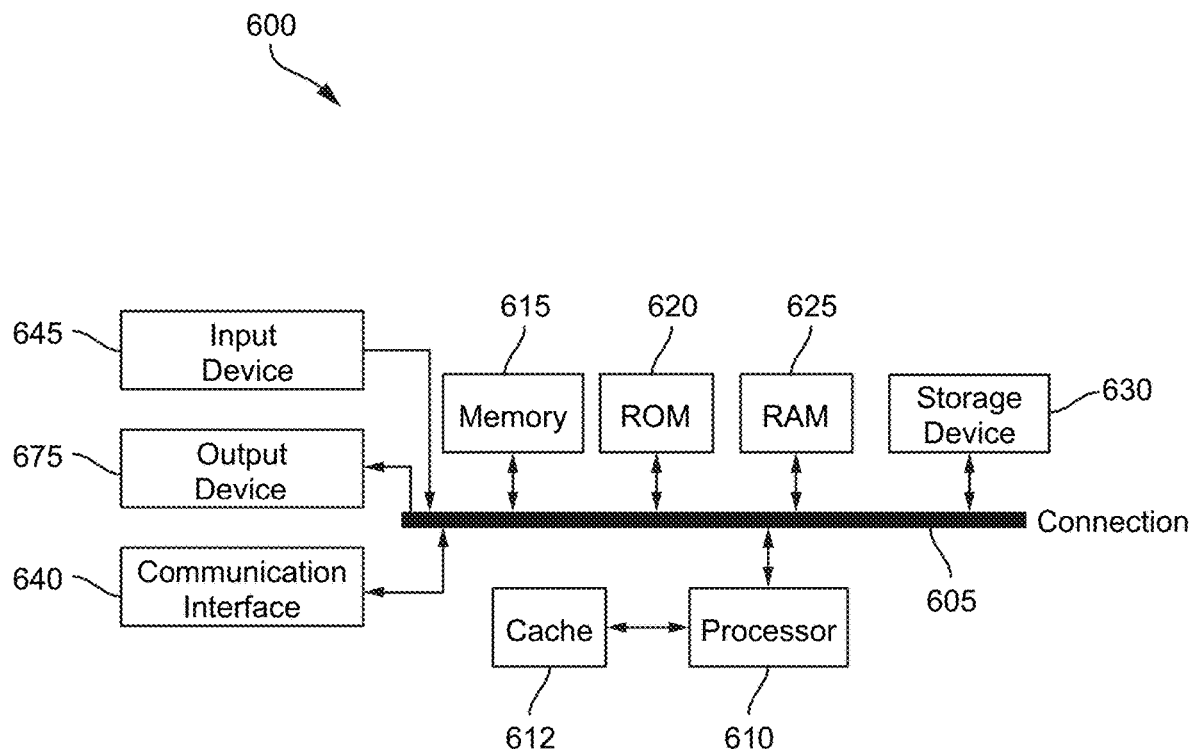
FIG. 6 illustrates an example computing device architecture, in accordance with some examples of the present disclosure.

FIG. 5A is a flowchart illustrating an example process 500 for using a wearable device (e.g., wearable device 150, wearable ring 200) with an XR device (e.g., XR system 100). In some examples, the process 500 can use the wearable device with the XR device to enhance tracking, power savings, and/or privacy functionalities at the XR device.

At block 502, the process 500 can include establishing a wireless connection between the wearable device and the XR device. The wireless connection can be established using a wireless communication interface (e.g., a wireless transmitter, wireless transceiver, or any other means for transmitting data) on the wearable device and a wireless communication interface on the XR device. The wireless communication interface on the wearable device can implement any wireless protocol and/or technology to communicate with the XR device, such as short-range wireless technologies (e.g., Bluetooth, etc.) for example. In some cases, the wearable device can be paired with the XR device for communications/interactions between the wearable device and the XR device.

In some examples, the body part associated with the user can include a hand, a finger, multiple fingers, and/or a wrist. In some cases, the wearable device can include a ring. In other cases, the wearable device can include a bracelet, a glove, a ring sleeve, or any other wearable item.

At block 504, the process 500 can include obtaining one or more tracking measurements at the wearable device. The wearable device can obtain the one or more tracking measurements using one or more sensors (e.g., IMU 152, ultrasonic sensor 154, pressure sensor 156, touch sensor 158) on the wearable device. In some examples, the one or more sensors can include an accelerometer, a gyroscope, a pressure sensor, an audio sensor, a touch sensor, and/or a magnetometer.

In some examples, the one or more tracking measurements can include a position of the structure in a physical space (e.g., in 3D space), movement of the structure, a distance of the structure relative to one or more objects, a velocity of the movement of the structure, an elevation of the structure in the physical space, and/or a pose of the structure in the physical space. In some examples, the one or more objects can include the XR device, a different body part (e.g., a different finger, a different hand, a different wrist, a different set of fingers, etc.) associated with the user, an input device (e.g., a controller, a stylus, a mouse, etc.), a wall, a person, an animal, a separate device, and/or any other object.

In some examples, at least one of the one or more tracking measurements can be relative to a reference coordinate system of the wearable device (and/or one or more sensors of the wearable device).

At block 506, the process 500 can include sending data associated with the one or more tracking measurements to the XR device. In some cases, the data can include the one or more tracking measurements. In some cases, the data can additionally or alternatively include data generated based at least partly on the one or more tracking measurements. In some examples, the data can include position information (e.g., a pose of the wearable device), one or more commands, one or more inputs, and/or any other data and/or sensor measurements. The XR device can use the data to track a target (e.g., the body part, the wearable device, etc.), adjust one or more device settings and/or operations, trigger a privacy mode, etc. In some cases, the XR device can use the data to validate/corroborate tracking results obtained by the XR device based on image data captured by the XR device. In some cases, the XR device can use the data to maintain tracking of the body part when the body part cannot be imaged by any image sensors on the XR device (e.g., because the body part is outside of a FOV of every image sensor, the XR device is operating in a privacy or non-imaging mode, the lighting conditions in the environment are poor or too dark, the body part is occluded from a view of every image sensor on the XR device, etc.).

In some cases, the XR device can use the data to distinguish the body part from other objects (e.g., other body parts, devices, people, etc.) to allow the XR device to detect and track the body part (or the correct body part). In some cases, the wearable device can send one or more signals to the XR device with a certain frequency pattern. The frequency pattern can be associated with the wearable device and can be used by the XR device to recognize the wearable device and the body part associated with the wearable device. In some examples, the XR device can use the frequency pattern to distinguish the wearable device and the body part from other objects in an environment. In some cases, the wearable device can include one or more visual patterns that the XR device can detect from one or more images to recognize the wearable device in the environment.

In some aspects, the process 500 can include sending, by the wearable device (e.g., via the wireless communication interface) to the XR device, an input configured to trigger a privacy mode at the XR device. In some examples, the privacy mode can include an operating state with one or more image sensors (e.g., image sensor 102, image sensor 104) at the XR device being turned off and/or disabled. The input can be based on the data obtained at block 504 and/or one or more associated measurements from one or more sensors on the wearable device. In some examples, the data can indicate a touch signal corresponding to a touch input at the wearable device, a location of the wearable device that differs from a location of the body part, and/or a distance between the wearable device and the body part. For example, the data can include an indication and/or one or more measurements indicating that the wearable device is not being worn by the user on the body part (e.g., is at a different location and/or within a threshold distance).

In some aspects, the process 500 can include sending, by the wearable device (e.g., via the wireless communication interface) to the XR device, an additional input configured to trigger the XR device to stop the privacy mode. The input can be based on data indicating a touch signal corresponding to a touch input at the wearable device, a location of the wearable device corresponding to a location of the body part (e.g., indicating that the user may be wearing the wearable device on the body part), and/or a proximity between the wearable device and the body part (e.g., indicating that the user may be wearing the wearable device on the body part).

In some aspects, the processing 500 can include sending, by the wearable device (e.g., via the wireless communication interface) to the XR device, an XR input associated with an XR application at the XR device. The XR input can be based on one or more measurements from one or more sensors on the wearable device.

In some aspects, the process 500 can include sending, by the wearable device (e.g., via the wireless communication interface) to the XR device, an input configured to trigger an adjustment of a device setting at the XR device and/or one or more XR operations at the XR device. In some examples, the device setting can include a power mode (e.g., off, on, lower power, higher power, etc.) associated with one or more image sensors at the XR device, a framerate associated with the one or more image sensors, a resolution associated with the one or more image sensors, etc. In some examples, the one or more XR operations can include object detection, object classification, gesture detection and/or recognition, pose estimation, shape estimation, etc.

Figure 5B:
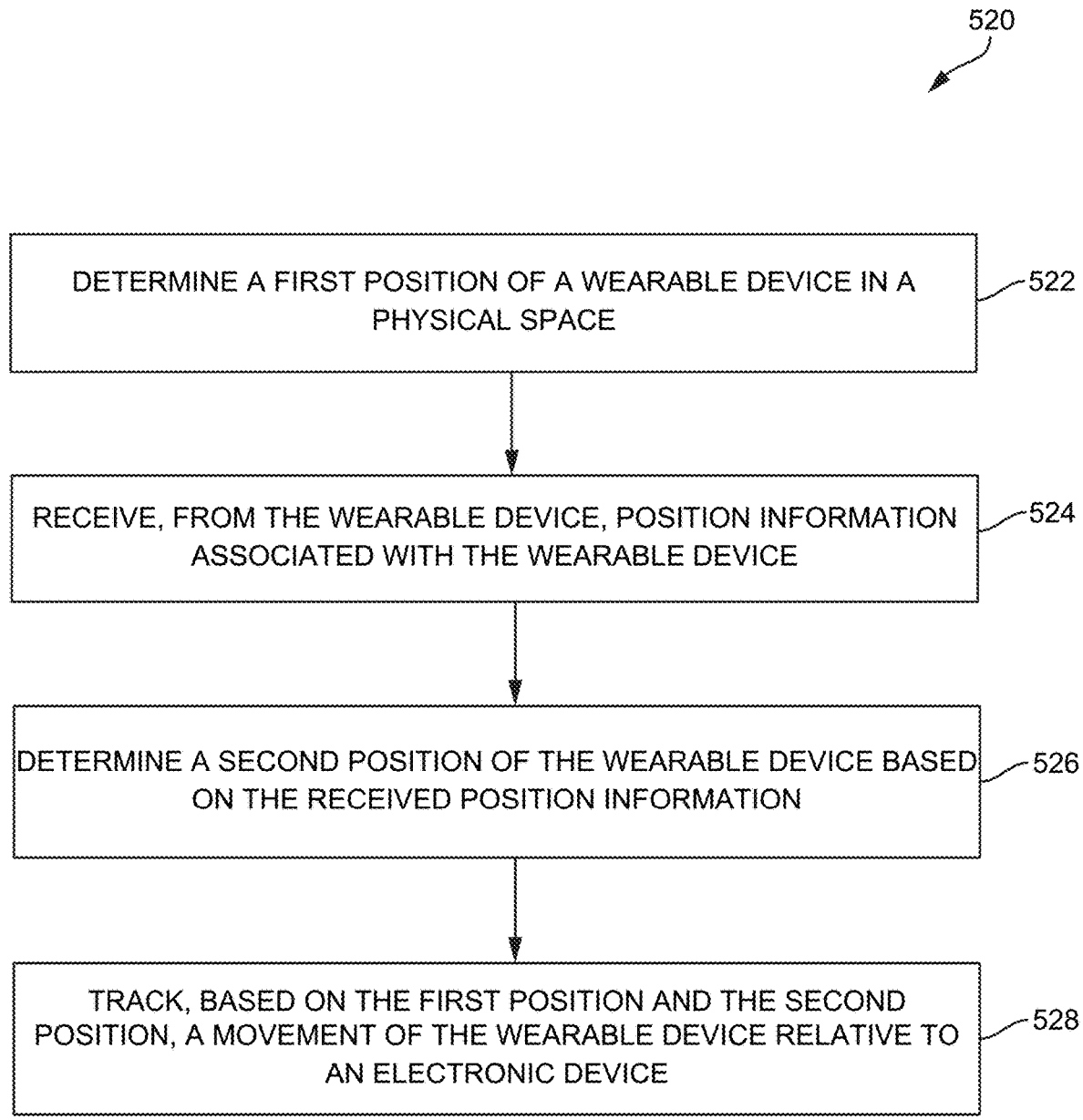
FIG. 5B is a flow diagram illustrating an example process for tracking objects, in accordance with some examples of the present disclosure.

FIG. 5B is a flowchart illustrating an example process 520 for tracking objects. In some examples, the process 520 can use a wearable device (e.g., wearable device 150, wearable ring 200) with an electronic device (e.g., XR system 100, etc.) to enhance tracking, power savings, and/or privacy functionalities at the electronic device. In some examples, the process 520 can be implemented by an electronic device, such as XR system 100. In some examples, the electronic device can include a mobile phone, a laptop, a tablet, a head-mounted display, smart glasses, a camera system, and/or any other electronic device.

At block 522, the process 520 can include determining a first position of a wearable device (e.g., wearable device 150, wearable ring 200) in a physical space. In some examples, determining the first position of the wearable device can include receiving, from the wearable device, image data from one or more image sensors on the electronic device and/or data associated with one or more measurements from one or more sensors on the wearable device; and determining the first position of the wearable device based on the image data from the one or more image sensors and/or data associated with the one or more measurements from the one or more sensors.

In some examples, the data can include a distance of the wearable device relative to one or more objects (e.g., a wall, a door, furniture, a device, a person, an animal, etc.), a velocity vector indicating a velocity of movement of the wearable device, a touch signal measured by a touch sensor from the one or more sensors, audio data from an audio sensor from the one or more sensors, and/or an elevation of the wearable device in the physical space. In some cases, the one or more objects can include the electronic device, a body part (e.g., a hand, a leg, an arm, a head, a torso, etc.) associated with a user of the wearable device, and/or an input device (e.g., a controller, a keyboard, a remote, etc.).

In some cases, the wearable device can include a bracelet, a ring, or a glove.

At block 524, the process 520 can include receiving, from the wearable device, position information associated with the wearable device. In some examples, the position information can include a pose of the wearable device. In some cases, the position information can be based on sensor data from one or more sensors on the wearable device. In some cases, the position information can include a measurement from an inertial measurement unit from one or more sensors on the wearable device and/or an elevation measured by a pressure sensor from the one or more sensors.

At block 526, the process 520 can include determining a second position of the wearable device based on the received position information. In some cases, the second position can include a position of the wearable device relative to the electronic device. In some cases, the second position can include a position of the wearable device within a coordinate system, such as a coordinate system of the wearable device and/or a coordinate system of the electronic device.

At block 528, the process 520 can include tracking, based on the first position and the second position, a movement of the wearable device relative to the electronic device.

In some aspects, tracking the movement of the wearable device can include determining the first position of the wearable device within a first coordinate system of the wearable device; transforming the first coordinate system of the wearable device to a second coordinate system of the electronic device; and determining the second position of the wearable device within the second coordinate system of the electronic device.

In some aspects, the process 520 can include determining, based on the second position of the wearable device and/or the tracked movement of the wearable device, whether the wearable device is within a FOV of one or more image sensors on the electronic device and/or visible to the one or more image sensors on the electronic device. In some aspects, the process 520 can include tracking, based on the second position of the wearable device and/or the tracked movement of the wearable device, a location of a hand associated with the wearable device. In some examples, the hand can include a hand wearing the wearable device (e.g., on a wrist, on a finger, etc.) or holding the wearable device.

In some aspects, the process 520 can include, based on a determination that the wearable device is within the FOV of the one or more image sensors and/or visible to the one or more image sensors, capturing one or more images of the hand via at least one image sensor from the one or more image sensors; and tracking the location of the hand based on the one or more images of the hand. In some examples, the location of the hand is tracked relative to a first coordinate system of the wearable device.

In some cases, the process 520 can include determining, based on the position information, that the wearable device is outside of the FOV of the one or more image sensors and moving towards an area within the FOV of the one or more image sensors; and based on the determining that the wearable device is outside of the FOV of the one or more image sensors and moving towards the area within the FOV of the one or more image sensors, initiating one or more imaging operations and/or one or more tracking operations at the electronic device. In some examples, the one or more tracking operations can be at least partly based on image data from the one or more imaging operations.

In some aspects, the process 520 can include, based on a first determination that the wearable device is within a first FOV of a first image sensor on the electronic device and/or a second determination that the wearable device is visible to the first image sensor on the electronic device, adjusting a first setting of the first image sensor. In some cases, the first setting can include a power mode of the first image sensor and/or an operating state of the first image sensor. In some aspects, the process 520 can include, based on a third determination that the wearable device is outside of a second FOV of a second image sensor on the electronic device and/or a fourth determination that the wearable device is not visible to the second image sensor on the electronic device, adjusting a second setting of the second image sensor. In some examples, the second setting can include a power mode of the second image sensor and/or an operating state of the second image sensor.

In some examples, adjusting the first setting of the first image sensor can include changing the power mode of the first image sensor from a first power mode to a second power mode including a higher power mode than the first power mode and/or changing the operating state of the first image sensor from a first operating state to a second operating state including a higher operating state than the first operating state. In some examples, the second operating state can include a higher framerate and/or a higher resolution.

In some examples, adjusting the second setting of the second image sensor can include changing the power mode of the second image sensor from a first power mode to a second power mode including a lower power mode than the first power mode and/or changing the operating state of the second image sensor from a first operating state to a second operating state including a lower operating state than the first operating state. In some cases, the second operating state can include a lower framerate and/or a lower resolution.

In some aspects, the process 520 can include, in response to a determination that the wearable device is outside of the FOV of the one or more image sensors on the electronic device and/or a view of the one or more image sensors to the wearable device is obstructed by one or more objects, tracking a location of the wearable device based on additional position information from the wearable device. In some aspects, the process 520 can include in response to a determination that the wearable device is within the FOV of the one or more image sensors but a view of the one or more image sensors to the wearable device is obstructed, tracking a location of the wearable device based on additional position information from the wearable device.

In some aspects, the process 520 can include, in response to the determination that the wearable device is within the FOV of the one or more image sensors but the view of the one or more image sensors to the wearable device is obstructed, initializing the one or more image sensors.

In some aspects, the process 520 can include receiving, from the wearable device, an input configured to trigger a privacy mode at the electronic device; and based on the input configured to trigger the privacy mode, adjusting an operating state of one or more image sensors at the electronic device to an off state and/or a disabled state. In some examples, the input can be based on sensor data from one or more sensors on the wearable device. In some cases, the sensor data can indicate a touch signal corresponding to a touch input at the wearable device, a location of the wearable device, and/or a distance between the wearable device and a body part of a user of the wearable device.

In some aspects, the process 520 can include receiving, from the wearable device, an additional input configured to trigger the electronic device to stop the privacy mode. In some cases, the additional input can be based on sensor data indicating a touch signal corresponding to a touch input at the wearable device, a location of the wearable device corresponding to a location of a body part of a user of the wearable device, and/or a proximity between the wearable device and the body part.

In some aspects, the process 520 can include determining, based on data from the wearable device and/or a command from the wearable device, one or more extended reality (XR) inputs to an XR application on the electronic device. In some examples, the one or more XR inputs can include a modification of a virtual element along multiple dimensions in space, a selection of the virtual element, a navigation event, and/or a request to measure a distance defined by the first position of the wearable device, the second position of the wearable device, and/or the movement of the wearable device.

In some examples, the virtual element can include a virtual object rendered by the electronic device, a virtual plane in an environment rendered by the electronic device, and/or the environment rendered by the electronic device. In some examples, the navigation event can include scrolling rendered content and/or moving from a first interface element to a second interface element.

In some aspects, the process 520 can include receiving, from the wearable device, an input configured to trigger an adjustment of one or more XR operations at the electronic device. In some examples, the one or more XR operations can include object detection, object classification, object tracking, pose estimation, and/or shape estimation.

In some examples, the process 500 or the process 520 may be performed by one or more computing devices or apparatuses. In one illustrative example, the process 500 can be performed by the XR system 100 and/or the wearable device 150 shown in FIG. 1 and/or one or more computing devices with the computing device architecture 600 shown in FIG. 6. In another illustrative example, the process 520 can be performed by the XR system 100 and/or one or more computing devices with the computing device architecture 600 shown in FIG. 6. In some cases, such a computing device or apparatus may include a processor, microprocessor, microcomputer, or other component of a device that is configured to carry out the steps of the process 500 or the process 520. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 500 and the process 520 are illustrated as logical flow diagrams, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 or the process 520 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 6 illustrates an example computing device architecture 600 of an example computing device which can implement various techniques described herein. For example, the computing device architecture 600 can implement at least some portions of the XR system 100 shown in FIG. 1. The components of the computing device architecture 600 are shown in electrical communication with each other using a connection 605, such as a bus. The example computing device architecture 600 includes a processing unit (CPU or processor) 610 and a computing device connection 605 that couples various computing device components including the computing device memory 615, such as read only memory (ROM) 620 and random access memory (RAM) 625, to the processor 610.

The computing device architecture 600 can include a cache of high-speed memory connected directly with, in close proximity to, or integrated as part of the processor 610. The computing device architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other computing device memory 615 may be available for use as well. The memory 615 can include multiple different types of memory with different performance characteristics. The processor 610 can include any general purpose processor and a hardware or software service stored in storage device 630 and configured to control the processor 610 as well as a special-purpose processor where software instructions are incorporated into the processor design. The processor 610 may be a self-contained system, containing multiple cores or processors, a bus, memory controller, cache, etc. A multi-core processor may be symmetric or asymmetric.

To enable user interaction with the computing device architecture 600, an input device 645 can represent any number of input mechanisms, such as a microphone for speech, a touch-sensitive screen for gesture or graphical input, keyboard, mouse, motion input, speech and so forth. An output device 665 can also be one or more of a number of output mechanisms known to those of skill in the art, such as a display, projector, television, speaker device. In some instances, multimodal computing devices can enable a user to provide multiple types of input to communicate with the computing device architecture 600. The communication interface 640 can generally govern and manage the user input and computing device output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. The storage device 630 can include software, code, firmware, etc., for controlling the processor 610. Other hardware or software modules are contemplated. The storage device 630 can be connected to the computing device connection 605. In one aspect, a hardware module that performs a particular function can include the software component stored in a computer-readable medium in connection with the necessary hardware components, such as the processor 610, connection 605, output device 665, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. A wearable device comprising: a structure defining a receiving space configured to receive a body part associated with a user, the structure comprising an engagement surface configured to contact the body part received via the receiving space; one or more sensors integrated with the structure, the one or more sensors being configured to obtain one or more tracking measurements associated with the wearable device, the one or more tracking measurements comprising at least one of a position of the structure in a physical space and movement of the structure; and a wireless transmitter configured to send, to an extended reality device, at least one of the position of the structure in the physical space and the movement of the structure.

Aspect 2. The wearable device of Aspect 1, wherein the one or more tracking measurements further comprise at least one of a distance of the structure relative to one or more objects, a velocity vector indicating a velocity of the movement of the structure, and an elevation of the structure in the physical space.

Aspect 3. The wearable device of any of Aspects 1 to 2, wherein the one or more objects comprise at least one of the XR device, a different body part associated with the user, and an input device.

Aspect 4. The wearable device of any of Aspects 1 to 3, wherein the body part associated with the user comprises at least one of a finger, a hand, and a wrist, and wherein the different body part associated with the user comprises at least one of a different finger, a different hand, and a different wrist.

Aspect 5. The wearable device of any of Aspects 1 to 4, wherein the wearable device is configured to send, via the wireless transmitter and to the XR device, an input configured to trigger a privacy mode at the XR device, and wherein the privacy mode comprises an operating state with one or more image sensors at the XR device being at least one of turned off and disabled.

Aspect 6. The wearable device of any of Aspects 1 to 5, wherein the input is based on one or more measurements from the one or more sensors, and wherein the one or more measurements indicate at least one of a touch signal corresponding to a touch input at the wearable device, a first location of the wearable device that differs from a second location of the body part, and a distance between the wearable device and the body part.

Aspect 7. The wearable device of any of Aspects 1 to 6, wherein the wearable device is configured to send, via the wireless transmitter and to the XR device, an additional input configured to trigger the XR device to stop the privacy mode, wherein the input is based on sensor data indicating at least one of a touch signal corresponding to a touch input at the wearable device, a location of the wearable device corresponding to a location of the body part, and a proximity between the wearable device and the body part.

Aspect 8. The wearable device of any of Aspects 1 to 7, wherein the wearable device is configured to send, via the wireless transmitter and to the XR device, an XR input associated with an XR application at the XR device, the XR input being based on one or more measurements from the one or more sensors.

Aspect 9. The wearable device of any of Aspects 1 to 8, wherein the wearable device is configured to send, via the wireless transmitter and to the XR device, an input configured to trigger an adjustment of at least one of a device setting at the XR device and one or more XR operations at the XR device.

Aspect 10. The wearable device of any of Aspects 1 to 9, wherein the device setting comprises at least one of a power mode associated with one or more image sensors, a framerate associated with one or more image sensors, and a resolution associated with one or more image sensors, and wherein the one or more XR operations comprise at least one of object detection, object classification, pose estimation, and shape estimation.

Aspect 11. The wearable device of any of Aspects 1 to 10, wherein the one or more sensors comprise at least one of an accelerometer, a gyroscope, a pressure sensor, an audio sensor, a touch sensor, and a magnetometer.

Aspect 12. The wearable device of any of Aspects 1 to 11, wherein the wearable device comprises a ring, and wherein the body part comprises a finger of the user.

Aspect 13. The wearable device of any of Aspects 1 to 11, wherein the wearable device comprises a bracelet, and wherein the body part comprises a wrist of the user.

Aspect 14. The wearable device of any of Aspects 1 to 11, wherein the wearable device comprises a glove, and wherein the body part comprises a hand of the user.

Aspect 15. A method for processing tracking data, the method comprising: establishing a wireless connection between a wearable device and an extended reality device, the wearable device comprising a structure defining a receiving space configured to receive a body part associated with a user, the structure comprising a surface configured to contact the body part received via the receiving space; obtaining, via one or more sensors integrated with the structure associated with the wearable device, one or more tracking measurements associated with the wearable device, the one or more tracking measurements comprising at least one of a position of the structure in a physical space and movement of the structure; and sending, via a wireless transmitter of the wearable device to the XR device, at least one of the position of the structure in the physical space and the movement of the structure.

Aspect 16. The method of Aspect 15, wherein the one or more tracking measurements further comprise at least one of a distance of the structure relative to one or more objects, a velocity vector indicating a velocity of the movement of the structure, and an elevation of the structure in the physical space.

Aspect 17. The method of any of Aspects 15 to 16, wherein the one or more objects comprise at least one of the XR device, a second body part associated with the user, and an input device.

Aspect 18. The method of any of Aspects 15 to 17, wherein the body part associated with the user comprises at least one of a finger, a hand, and a wrist, and wherein the second body part associated with the user comprises at least one of a second finger, a second hand, and a second wrist.

Aspect 19. The method of any of Aspects 15 to 18, further comprising sending, via the wireless transmitter of the wearable device to the XR device, an input configured to trigger a privacy mode at the XR device, wherein the privacy mode comprises an operating state with one or more image sensors at the XR device being at least one of turned off and disabled.

Aspect 20. The method of any of Aspects 15 to 19, wherein the input is based on one or more measurements from the one or more sensors, and wherein the one or more measurements indicate at least one of a touch signal corresponding to a touch input at the wearable device, a first location of the wearable that differs from a second location of the body part, and a distance between the wearable and the body part.

Aspect 21. The method of any of Aspects 15 to 20, further comprising sending, via the wireless transmitter of the wearable device to the XR device, an additional input configured to trigger the XR device to stop the privacy mode, wherein the input is based on sensor data indicating at least one of a touch signal corresponding to a touch input at the wearable device, a location of the wearable device corresponding to a location of the body part, and a proximity between the wearable device and the body part.

Aspect 22. The method of any of Aspects 15 to 21, further comprising sending, via the wireless transmitter of the wearable device to the XR device, an XR input associated with an XR application at the XR device, the XR input being based on one or more measurements from the one or more sensors.

Aspect 23. The method of any of Aspects 15 to 22, further comprising sending, via the wireless transmitter of the wearable device to the XR device, an input configured to trigger an adjustment of at least one of a device setting at the XR device and one or more XR operations at the XR device.

Aspect 24. The method of any of Aspects 15 to 23, wherein the device setting comprises at least one of a power mode associated with one or more image sensors, a framerate associated with one or more image sensors, and a resolution associated with one or more image sensors, and wherein the one or more XR operations comprise at least one of object detection, object classification, pose estimation, and shape estimation.

Aspect 25. The method of any of Aspects 15 to 24, wherein the wearable device comprises a ring, and wherein the body part comprises a finger of the user.

Aspect 26. The method of any of Aspects 15 to 25, wherein the wearable device comprises a bracelet, and wherein the body part comprises a wrist of the user.

Aspect 27. The method of any of Aspects 15 to 26, wherein the wearable device comprises a glove, and wherein the body part comprises a hand of the user.

Aspect 28. The method of any of Aspects 15 to 27, wherein the one or more sensors comprise at least one of an accelerometer, a gyroscope, a pressure sensor, an audio sensor, a touch sensor, and a magnetometer.

Aspect 29. A non-transitory computer-readable medium having stored thereon instructions which, when executed by one or more processors, cause the one or more processors to perform a method according to any of Aspects 15 to 27.

Aspect 30. A wearable device comprising means for performing a method according to any of Aspects 15 to 27.

Aspect 31. The wearable device of Aspect 30, wherein the one or more sensors comprise at least one of an accelerometer, a gyroscope, a pressure sensor, an audio sensor, a touch sensor, and a magnetometer.

Aspect 32. The wearable device of Aspect 30 or 31, wherein the wearable device comprises a glove, and wherein the body part comprises a hand of the user.

Aspect 33. The wearable device of Aspect 30 or 31, wherein the wearable device comprises a ring, and wherein the body part comprises a finger of the user.

Aspect 34. The wearable device of Aspect 30 or 31, wherein the wearable device comprises a bracelet, and wherein the body part comprises a wrist of the user.

Aspect 35. A method for processing tracking data, the method comprising: establishing a wireless connection between a wearable device and an extended reality (XR) device, the wearable device comprising a structure defining a receiving space configured to receive a body part associated with a user, the structure comprising a surface configured to contact the body part received via the receiving space; receiving, from the wearable device, one or more tracking measurements calculated by one or more sensors of the wearable device, the one or more tracking measurements comprising at least one of a position of the structure in a physical space and movement of the structure; and translating, by the XR device, the one or more tracking measurements into one or more XR inputs to an XR application at the XR device.

Aspect 36. The method of Aspect 35, wherein the one or more tracking measurements further comprise at least one of a distance of the structure relative to one or more objects, a velocity vector indicating a velocity of the movement of the structure, and an elevation of the structure in the physical space.

Aspect 37. The method of Aspect 36, wherein the one or more objects comprise at least one of the XR device, a second body part associated with the user, and an input device.

Aspect 38. The method of Aspect 37, wherein the body part associated with the user comprises at least one of a finger, a hand, and a wrist, and wherein the second body part associated with the user comprises at least one of a second finger, a second hand, and a second wrist.

Aspect 39. The method of any of Aspects 35 to 37, wherein the one or more XR inputs comprise at least one of a request to measure a distanced defined by the at least one of the position of the structure in the physical space and the movement of the structure, a modification of a virtual element along multiple dimensions in space, a selection of the virtual element, and a navigation event.

Aspect 40. The method of Aspect 39, wherein the virtual element comprises at least one of a virtual object rendered by the XR device, a virtual plane in an environment rendered by the XR device, and the environment rendered by the XR device.

Aspect 41. The method of Aspect 39, wherein the navigation event comprises at least one of scrolling rendered content and moving from a first interface element to a second interface element.

Aspect 42. The method of any of Aspects 35 to 41, further comprising receiving, from the wearable device, an input configured to trigger a privacy mode at the XR device, wherein the privacy mode comprises an operating state with one or more image sensors at the XR device being at least one of turned off and disabled.

Aspect 43. The method of Aspect 42, wherein the input is based on one or more measurements from the one or more sensors, and wherein the one or more measurements indicate at least one of a touch signal corresponding to a touch input at the wearable device, a first location of the wearable that differs from a second location of the body part, and a distance between the wearable and the body part.

Aspect 44. The method of Aspect 42, further comprising receiving, from the wearable device to the XR device, an additional input configured to trigger the XR device to stop the privacy mode, wherein the input is based on sensor data indicating at least one of a touch signal corresponding to a touch input at the wearable device, a location of the wearable device corresponding to a location of the body part, and a proximity between the wearable device and the body part.

Aspect 45. The method of any of Aspects 35 to 44, further comprising receiving, from the wearable device, an input configured to trigger an adjusted power mode at the XR device, wherein the adjusted power mode comprises a lower power state relative to a power state prior to the adjusted power mode.

Aspect 46. The method of any of Aspects 35 to 45, further comprising receiving, from the wearable device to the XR device, an input configured to trigger an adjustment of at least one of a device setting at the XR device and one or more XR operations at the XR device.

Aspect 47. The method of Aspect 46, wherein the device setting comprises at least one of a power mode associated with one or more image sensors, a framerate associated with one or more image sensors, and a resolution associated with one or more image sensors.

Aspect 48. The method of Aspect 46 or 47, wherein the one or more XR operations comprise at least one of object detection, object classification, pose estimation, and shape estimation.

Aspect 49. The method of any of Aspects 35 to 48, wherein the one or more sensors comprise at least one of an accelerometer, a gyroscope, a pressure sensor, an audio sensor, a touch sensor, and a magnetometer.

Aspect 50. The method of any of Aspects 35 to 49, wherein the wearable device comprises a bracelet, and wherein the body part comprises a wrist of the user.

Aspect 51. The method of any of Aspects 35 to 49, wherein the wearable device comprises a ring, and wherein the body part comprises a finger of the user.

Aspect 52. The method of any of Aspects 35 to 49, wherein the wearable device comprises a glove, and wherein the body part comprises a hand of the user.

Aspect 53. An apparatus for processing tracking data, the apparatus comprising: memory; and one or more processors coupled to the memory, the one or more processors being configured to: establish a wireless connection between a wearable device and an extended reality (XR) device, the wearable device comprising a structure defining a receiving space configured to receive a body part associated with a user, the structure comprising a surface configured to contact the body part received via the receiving space; receive, from the wearable device, one or more tracking measurements calculated by one or more sensors of the wearable device, the one or more tracking measurements comprising at least one of a position of the structure in a physical space and movement of the structure; and translate, by the XR device, the one or more tracking measurements into one or more XR inputs to an XR application at the XR device.

Aspect 54. The apparatus of Aspect 53, wherein the one or more tracking measurements further comprise at least one of a distance of the structure relative to one or more objects, a velocity vector indicating a velocity of the movement of the structure, and an elevation of the structure in the physical space.

Aspect 55. The apparatus of Aspect 54, wherein the one or more objects comprise at least one of the XR device, a second body part associated with the user, and an input device.

Aspect 56. The apparatus of Aspect 55, wherein the body part associated with the user comprises at least one of a finger, a hand, and a wrist, and wherein the second body part associated with the user comprises at least one of a second finger, a second hand, and a second wrist.

Aspect 57. The apparatus of any of Aspects 53 to 55, wherein the one or more XR inputs comprise at least one of a request to measure a distanced defined by the at least one of the position of the structure in the physical space and the movement of the structure, a modification of a virtual element along multiple dimensions in space, a selection of the virtual element, and a navigation event.

Aspect 58. The apparatus of Aspect 57, wherein the virtual element comprises at least one of a virtual object rendered by the XR device, a virtual plane in an environment rendered by the XR device, and the environment rendered by the XR device.

Aspect 59. The apparatus of Aspect 57, wherein the navigation event comprises at least one of scrolling rendered content and moving from a first interface element to a second interface element.

Aspect 60. The apparatus of any of Aspects 53 to 59, further comprising receiving, from the wearable device, an input configured to trigger a privacy mode at the XR device, wherein the privacy mode comprises an operating state with one or more image sensors at the XR device being at least one of turned off and disabled.

Aspect 61. The apparatus of Aspect 60, wherein the input is based on one or more measurements from the one or more sensors, and wherein the one or more measurements indicate at least one of a touch signal corresponding to a touch input at the wearable device, a first location of the wearable that differs from a second location of the body part, and a distance between the wearable and the body part.

Aspect 62. The apparatus of Aspect 60, further comprising receiving, from the wearable device to the XR device, an additional input configured to trigger the XR device to stop the privacy mode, wherein the input is based on sensor data indicating at least one of a touch signal corresponding to a touch input at the wearable device, a location of the wearable device corresponding to a location of the body part, and a proximity between the wearable device and the body part.

Aspect 63. The apparatus of any of Aspects 53 to 62, further comprising receiving, from the wearable device, an input configured to trigger an adjusted power mode at the XR device, wherein the adjusted power mode comprises a lower power state relative to a power state prior to the adjusted power mode.

Aspect 64. The apparatus of any of Aspects 53 to 63, further comprising receiving, from the wearable device to the XR device, an input configured to trigger an adjustment of at least one of a device setting at the XR device and one or more XR operations at the XR device.

Aspect 65. The apparatus of Aspect 64, wherein the device setting comprises at least one of a power mode associated with one or more image sensors, a framerate associated with one or more image sensors, and a resolution associated with one or more image sensors.

Aspect 66. The apparatus of Aspect 64 or 65, wherein the one or more XR operations comprise at least one of object detection, object classification, pose estimation, and shape estimation.

Aspect 67. The apparatus of any of Aspects 53 to 66, wherein the one or more sensors comprise at least one of an accelerometer, a gyroscope, a pressure sensor, an audio sensor, a touch sensor, and a magnetometer.

Aspect 68. The apparatus of any of Aspects 53 to 67, wherein the wearable device comprises a bracelet, and wherein the body part comprises a wrist of the user.

Aspect 69. The apparatus of any of Aspects 53 to 67, wherein the wearable device comprises a ring, and wherein the body part comprises a finger of the user.

Aspect 70. The apparatus of any of Aspects 53 to 67, wherein the wearable device comprises a glove, and wherein the body part comprises a hand of the user.

Aspect 71. The apparatus of any of Aspects 53 to 67, wherein the apparatus comprises a mobile device.

Aspect 72. The apparatus of any of Aspects 53 to 67, wherein the apparatus comprises a camera.

Aspect 73. The apparatus of any of Aspects 53 to 67, wherein the apparatus comprises the XR device and a display.

Aspect 74. A non-transitory computer-readable medium having stored thereon instructions which, when executed by one or more processors, cause the one or more processors to perform a method according to any of Aspects 35 to 52.

Aspect 75. An apparatus comprising means for performing a method according to any of Aspects 35 to 52.

Aspect 76. An apparatus comprising: memory; and one or more processors coupled to the memory, the one or more processors being configured to: determine a first position of a wearable device in a physical space; receive, from the wearable device, position information associated with the wearable device; determine a second position of the wearable device based on the received position information; and track, based on the first position and the second position, a movement of the wearable device relative to the apparatus.

Aspect 77. The apparatus of Aspect 76, wherein, to track the movement of the wearable device, the one or more processors are configured to: determine the first position of the wearable device within a first coordinate system of the wearable device; transform the first coordinate system of the wearable device to a second coordinate system of the apparatus; and determine the second position of the wearable device within the second coordinate system of the apparatus.

Aspect 78. The apparatus of any of Aspects 76 to 77, wherein the one or more processors are configured to: determine, based on at least one of the second position of the wearable device and the tracked movement of the wearable device, whether the wearable device is at least one of within a field-of-view (FOV) of one or more image sensors on the apparatus and visible to the one or more image sensors on the apparatus.

Aspect 79. The apparatus of Aspect 78, wherein the one or more processors are configured to: track, based on at least one of the second position of the wearable device and the tracked movement of the wearable device, a location of a hand associated with the wearable device.

Aspect 80. The apparatus of Aspect 79, wherein the one or more processors are configured to: based on a determination that the wearable device is within the FOV of the one or more image sensors and visible to the one or more image sensors, capture one or more images of the hand via at least one image sensor from the one or more image sensors; and track the location of the hand further based on the one or more images of the hand, the location of the hand being tracked relative to a first coordinate system of the wearable device.

Aspect 81. The apparatus of Aspect 78, wherein the one or more processors are configured to: determine, based on the position information, that the wearable device is outside of the FOV of the one or more image sensors and moving towards an area within the FOV of the one or more image sensors; and based on the determining that the wearable device is outside of the FOV of the one or more image sensors and moving towards the area within the FOV of the one or more image sensors, initiate one or more imaging operations and one or more tracking operations at the apparatus, the one or more tracking operations being at least partly based on image data from the one or more imaging operations.

Aspect 82. The apparatus of Aspect 78, wherein the one or more processors are configured to: based on at least one of a first determination that the wearable device is within a first FOV of a first image sensor on the apparatus and a second determination that the wearable device is visible to the first image sensor on the apparatus, adjust a first setting of the first image sensor, the first setting comprising at least one of a power mode of the first image sensor and an operating state of the first image sensor; and based on at least one of a third determination that the wearable device is outside of a second FOV of a second image sensor on the apparatus and a fourth determination that the wearable device is not visible to the second image sensor on the apparatus, adjust a second setting of the second image sensor, the second setting comprising at least one of a power mode of the second image sensor and an operating state of the second image sensor.

Aspect 83. The apparatus of Aspect 82, wherein, to adjust the first setting of the first image sensor, the one or more processors are configured to change at least one of the power mode of the first image sensor from a first power mode to a second power mode comprising a higher power mode than the first power mode and the operating state of the first image sensor from a first operating state to a second operating state comprising a higher operating state than the first operating state, the second operating state comprising at least one of a higher framerate and a higher resolution.

Aspect 84. The apparatus of Aspect 82, wherein, to adjust the second setting of the second image sensor, the one or more processors are configured to change at least one of the power mode of the second image sensor from a first power mode to a second power mode comprising a lower power mode than the first power mode and the operating state of the second image sensor from a first operating state to a second operating state comprising a lower operating state than the first operating state, the second operating state comprising at least one of a lower framerate and a lower resolution.

Aspect 85. The apparatus of Aspect 78, wherein the one or more processors are configured to: in response to a determination that the wearable device is not visible to the one or more image sensors on the apparatus, track a location of the wearable device based on additional position information from the wearable device.

Aspect 86. The apparatus of Aspect 78, wherein the one or more processors are configured to: in response to a determination that the wearable device is within the FOV of the one or more image sensors and a view of the one or more image sensors to the wearable device is obstructed, track a location of the wearable device based on additional position information from the wearable device.

Aspect 87. The apparatus of Aspect 86, wherein the one or more processors are configured to: in response to the determination that the wearable device is within the FOV of the one or more image sensors and the view of the one or more image sensors to the wearable device is obstructed, initialize the one or more image sensors.

Aspect 88. The apparatus of any of Aspects 76 to 87, wherein, to determine the first position of the wearable device, the one or more processors are configured to: receive, from the wearable device, at least one of image data from one or more image sensors on the apparatus and data associated with one or more measurements from one or more sensors on the wearable device; and determine the first position of the wearable device based on at least one of the image data from the one or more image sensors and data associated with the one or more measurements from the one or more sensors.

Aspect 89. The apparatus of Aspect 88, wherein the data comprises at least one of a distance of the wearable device relative to one or more objects, a velocity vector indicating a velocity of the movement of the wearable device, a touch signal measured by a touch sensor from the one or more sensors, audio data from an audio sensor from the one or more sensors, and an elevation of the wearable device in the physical space, and wherein the one or more objects comprise at least one of the apparatus, a body part associated with a user of the wearable device, and an input device.

Aspect 90. The apparatus of any of Aspects 76 to 89, wherein the one or more processors are configured to: receive, from the wearable device, an input configured to trigger a privacy mode at the apparatus; and based on the input configured to trigger the privacy mode, adjust an operating state of one or more image sensors at the apparatus to at least one of an off state and a disabled state.

Aspect 91. The apparatus of Aspect 90, wherein the input is based on sensor data from one or more sensors on the wearable device, and wherein the sensor data indicates at least one of a touch signal corresponding to a touch input at the wearable device, a location of the wearable device, and a distance between the wearable device and a body part of a user of the wearable device.

Aspect 92. The apparatus of any of Aspects 90 to 91, wherein the one or more processors are configured to: receive, from the wearable device, an additional input configured to trigger the apparatus to stop the privacy mode, wherein the additional input is based on sensor data indicating at least one of a touch signal corresponding to a touch input at the wearable device, a location of the wearable device corresponding to a location of a body part of a user of the wearable device, and a proximity between the wearable device and the body part.

Aspect 93. The apparatus of any of Aspects 76 to 92, wherein the one or more processors are configured to: determine, based on at least one of data from the wearable device and a command from the wearable device, one or more extended reality (XR) inputs to an XR application on the apparatus.

Aspect 94. The apparatus of Aspect 93, wherein the one or more XR inputs comprise at least one of a modification of a virtual element along multiple dimensions in space, a selection of the virtual element, a navigation event, and a request to measure a distance defined by at least one of the first position of the wearable device, the second position of the wearable device, and the movement of the wearable device.

Aspect 95. The apparatus of Aspect 94, wherein the virtual element comprises at least one of a virtual object rendered by the apparatus, a virtual plane in an environment rendered by the apparatus, and the environment rendered by the apparatus.

Aspect 96. The apparatus of any of Aspects 94 to 95, wherein the navigation event comprises at least one of scrolling rendered content and moving from a first interface element to a second interface element.

Aspect 97. The apparatus of any of Aspects 76 to 96, wherein the one or more processors are configured to: receive, from the wearable device, an input configured to trigger an adjustment of one or more XR operations at the apparatus, wherein the one or more XR operations comprise at least one of object detection, object classification, object tracking, pose estimation, and shape estimation.

Aspect 98. The apparatus of any of Aspects 76 to 97, wherein the wearable device comprises a bracelet, a ring, or a glove, and wherein the position information comprises at least one of a measurement from an inertial measurement unit from one or more sensors on the wearable device and an elevation measured by a pressure sensor from the one or more sensors.

Aspect 99. The apparatus of any of Aspects 76 to 98, wherein the apparatus comprises a mobile device.

Aspect 100. The apparatus of any of Aspects 76 to 99, wherein the apparatus comprises a camera.

Aspect 101. The apparatus of any of Aspects 76 to 100, wherein the apparatus comprises an XR device and a display.

Aspect 102. A method comprising: determining a first position of a wearable device in a physical space; receiving, from the wearable device, position information associated with the wearable device; determining a second position of the wearable device based on the received position information; and tracking, based on the first position and the second position, a movement of the wearable device relative to an electronic device.

Aspect 103. The method of Aspect 102, wherein tracking the movement of the wearable device further comprises: determining the first position of the wearable device within a first coordinate system of the wearable device; transforming the first coordinate system of the wearable device to a second coordinate system of the electronic device; and determining the second position of the wearable device within the second coordinate system of the electronic device.

Aspect 104. The method of any of Aspects 102 to 103, further comprising: determining, based on at least one of the second position of the wearable device and the tracked movement of the wearable device, whether the wearable device is at least one of within a field-of-view (FOV) of one or more image sensors on the electronic device and visible to the one or more image sensors on the electronic device.

Aspect 105. The method of Aspect 104, further comprising: tracking, based on at least one of the second position of the wearable device and the tracked movement of the wearable device, a location of a hand associated with the wearable device.

Aspect 106. The method of Aspect 105, further comprising: based on a determination that the wearable device is within the FOV of the one or more image sensors and visible to the one or more image sensors, capturing one or more images of the hand via at least one image sensor from the one or more image sensors; and tracking the location of the hand further based on the one or more images of the hand, the location of the hand being tracked relative to a first coordinate system of the wearable device.

Aspect 107. The method of Aspect 104, further comprising: determining, based on the position information, that the wearable device is outside of the FOV of the one or more image sensors and moving towards an area within the FOV of the one or more image sensors; and based on the determining that the wearable device is outside of the FOV of the one or more image sensors and moving towards the area within the FOV of the one or more image sensors, initiating one or more imaging operations and one or more tracking operations at the electronic device, the one or more tracking operations being at least partly based on image data from the one or more imaging operations.

Aspect 108. The method of Aspect 104, further comprising: based on at least one of a first determination that the wearable device is within a first FOV of a first image sensor on the electronic device and a second determination that the wearable device is visible to the first image sensor on the electronic device, adjusting a first setting of the first image sensor, the first setting comprising at least one of a power mode of the first image sensor and an operating state of the first image sensor; and based on at least one of a third determination that the wearable device is outside of a second FOV of a second image sensor on the electronic device and a fourth determination that the wearable device is not visible to the second image sensor on the electronic device, adjusting a second setting of the second image sensor, the second setting comprising at least one of a power mode of the second image sensor and an operating state of the second image sensor.

Aspect 109. The method of Aspect 108, wherein adjusting the first setting of the first image sensor further comprises changing at least one of the power mode of the first image sensor from a first power mode to a second power mode comprising a higher power mode than the first power mode and the operating state of the first image sensor from a first operating state to a second operating state comprising a higher operating state than the first operating state, the second operating state comprising at least one of a higher framerate and a higher resolution.

Aspect 110. The method of Aspect 108, wherein adjusting the second setting of the second image sensor further comprises changing at least one of the power mode of the second image sensor from a first power mode to a second power mode comprising a lower power mode than the first power mode and the operating state of the second image sensor from a first operating state to a second operating state comprising a lower operating state than the first operating state, the second operating state comprising at least one of a lower framerate and a lower resolution.

Aspect 111. The method of Aspect 104, further comprising: in response to a determination that the wearable device is not visible to the one or more image sensors on the electronic device, tracking a location of the wearable device based on additional position information from the wearable device.

Aspect 112. The method of Aspect 104, further comprising: in response to a determination that the wearable device is within the FOV of the one or more image sensors and a view of the one or more image sensors to the wearable device is obstructed, tracking a location of the wearable device based on additional position information from the wearable device.

Aspect 113. The method of Aspect 112, further comprising: in response to the determination that the wearable device is within the FOV of the one or more image sensors and the view of the one or more image sensors to the wearable device is obstructed, initializing the one or more image sensors.

Aspect 114. The method of any of Aspects 102 to 113, wherein determining the first position of the wearable device further comprises: receiving, from the wearable device, at least one of image data from one or more image sensors on the electronic device and data associated with one or more measurements from one or more sensors on the wearable device; and determining the first position of the wearable device based on at least one of the image data from the one or more image sensors and data associated with the one or more measurements from the one or more sensors.

Aspect 115. The method of Aspect 114, wherein the data comprises at least one of a distance of the wearable device relative to one or more objects, a velocity vector indicating a velocity of the movement of the wearable device, a touch signal measured by a touch sensor from the one or more sensors, audio data from an audio sensor from the one or more sensors, and an elevation of the wearable device in the physical space, and wherein the one or more objects comprise at least one of the electronic device, a body part associated with a user of the wearable device, and an input device.

Aspect 116. The method of any of Aspects 102 to 115, further comprising: receiving, from the wearable device, an input configured to trigger a privacy mode at the electronic device; and based on the input configured to trigger the privacy mode, adjusting an operating state of one or more image sensors at the electronic device to at least one of an off state and a disabled state.

Aspect 117. The method of Aspect 116, wherein the input is based on sensor data from one or more sensors on the wearable device, and wherein the sensor data indicates at least one of a touch signal corresponding to a touch input at the wearable device, a location of the wearable device, and a distance between the wearable device and a body part of a user of the wearable device.

Aspect 118. The method of any of Aspects 116 to 117, further comprising: receiving, from the wearable device, an additional input configured to trigger the electronic device to stop the privacy mode, wherein the additional input is based on sensor data indicating at least one of a touch signal corresponding to a touch input at the wearable device, a location of the wearable device corresponding to a location of a body part of a user of the wearable device, and a proximity between the wearable device and the body part.

Aspect 119. The method of any of Aspects 102 to 118, further comprising: determining, based on at least one of data from the wearable device and a command from the wearable device, one or more extended reality (XR) inputs to an XR application on the electronic device.

Aspect 120. The method of Aspect 119, wherein the one or more XR inputs comprise at least one of a modification of a virtual element along multiple dimensions in space, a selection of the virtual element, a navigation event, and a request to measure a distance defined by at least one of the first position of the wearable device, the second position of the wearable device, and the movement of the wearable device.

Aspect 121. The method of Aspect 120, wherein the virtual element comprises at least one of a virtual object rendered by the electronic device, a virtual plane in an environment rendered by the electronic device, and the environment rendered by the electronic device.

Aspect 122. The method of any of Aspects 120 to 121, wherein the navigation event comprises at least one of scrolling rendered content and moving from a first interface element to a second interface element.

Aspect 123. The method of any of Aspects 102 to 122, further comprising: receiving, from the wearable device, an input configured to trigger an adjustment of one or more XR operations at the electronic device, wherein the one or more XR operations comprise at least one of object detection, object classification, object tracking, pose estimation, and shape estimation.

Aspect 124. The method of any of Aspects 102 to 123, wherein the wearable device comprises a bracelet, a ring, or a glove, and wherein the position information comprises at least one of a measurement from an inertial measurement unit from one or more sensors on the wearable device and an elevation measured by a pressure sensor from the one or more sensors.

Aspect 125. A non-transitory computer-readable medium having stored thereon instructions which, when executed by one or more processors, cause the one or more processors to perform a method according to any of Aspects 102 to 124.

Aspect 126. An apparatus comprising means for performing a method according to any of Aspects 102 to 124.

Aspect 127. The apparatus of Aspect 126, wherein the apparatus comprises a mobile device.

Aspect 128. The apparatus of any of Aspects 126 to 127, wherein the apparatus comprises a camera.

Aspect 129. The apparatus of any of Aspects 126 to 128, wherein the apparatus comprises an XR device and a display.

What is claimed is:
1. An apparatus comprising:
  memory; and
  one or more processors coupled to the memory, the one or more processors being configured to:
    determine a first position of a wearable device in a physical space;
    receive, from the wearable device, position information associated with the wearable device;
    determine a second position of the wearable device based on the received position information;
    track, based on the first position and the second position, a movement of the wearable device relative to the apparatus;
    determine, based on at least one of the second position of the wearable device or the movement of the wearable device, that the wearable device is outside of a field-of-view (FOV) of one or more image sensors on the apparatus and the movement of the wearable device is towards an area within the FOV of the one or more image sensors; and initiate, based on a determination that the wearable device is outside of the FOV of the one or more image sensors and the movement of the wearable device is towards the area within the FOV of the one or more image sensors, one or more imaging operations and one or more tracking operations at the apparatus, the one or more tracking operations being at least partly based on image data from the one or more imaging operations.

2. The apparatus of claim 1, wherein, to track the movement of the wearable device, the one or more processors are configured to:

determine the first position of the wearable device within a first coordinate system of the wearable device;

transform the first coordinate system of the wearable device to a second coordinate system of the apparatus; and determine the second position of the wearable device within the second coordinate system of the apparatus.

3. The apparatus of claim 1, wherein the one or more processors are configured to:

track, based on at least one of the second position of the wearable device or the movement of the wearable device, a location of a hand associated with the wearable device.

4. The apparatus of claim 3, wherein the one or more processors are configured to:

based on a determination that the wearable device is within the FOV of the one or more image sensors, capture one or more images of the hand via at least one image sensor from the one or more image sensors; and track the location of the hand further based on the one or more images of the hand, the location of the hand being tracked relative to a first coordinate system of the wearable device.

5. The apparatus of claim 1, wherein the one or more processors are configured to:

based on a first determination that the wearable device is within a first FOV of a first image sensor on the apparatus, adjust a first setting of the first image sensor, the first setting comprising at least one of a power mode of the first image sensor or an operating state of the first image sensor; and based on second determination that the wearable device is outside of a second FOV of a second image sensor on the apparatus, adjust a second setting of the second image sensor, the second setting comprising at least one of a power mode of the second image sensor or an operating state of the second image sensor.

6. The apparatus of claim 5, wherein, to adjust the first setting of the first image sensor, the one or more processors are configured to change at least one of the power mode of the first image sensor from a first power mode to a second power mode comprising a higher power mode than the first power mode or the operating state of the first image sensor from a first operating state to a second operating state comprising a higher operating state than the first operating state, the second operating state comprising at least one of a higher framerate or a higher resolution.

7. The apparatus of claim 5, wherein, to adjust the second setting of the second image sensor, the one or more processors are configured to change at least one of the power mode of the second image sensor from a first power mode to a second power mode comprising a lower power mode than the first power mode or the operating state of the second image sensor from a first operating state to a second operating state comprising a lower operating state than the first operating state, the second operating state comprising at least one of a lower framerate or a lower resolution.

8. The apparatus of claim 1, wherein the one or more processors are configured to:

based on the determination that the wearable device is outside of the FOV of the one or more image sensors, track a location of the wearable device based on additional position information from the wearable device.

9. The apparatus of claim 1, wherein the one or more processors are configured to:

in response to a determination that the wearable device is within the FOV of the one or more image sensors and a view of the one or more image sensors to the wearable device is obstructed, track a location of the wearable device based on additional position information received from the wearable device.

10. The apparatus of claim 9, wherein the one or more processors are configured to:

in response to the determination that the wearable device is within the FOV of the one or more image sensors and the view of the one or more image sensors to the wearable device is obstructed, initialize the one or more image sensors.

11. The apparatus of claim 1, wherein, to determine the first position of the wearable device, the one or more processors are configured to:

receive at least one of image data from one or more image sensors on the apparatus or data associated with one or more measurements from one or more sensors on the wearable device; and determine the first position of the wearable device based on at least one of the image data from the one or more image sensors or data associated with the one or more measurements from the one or more sensors.

12. The apparatus of claim 11, wherein the data comprises at least one of a distance of the wearable device relative to one or more objects, a velocity vector indicating a velocity of the movement of the wearable device, a touch signal measured by a touch sensor from the one or more sensors, audio data from an audio sensor from the one or more sensors, and an elevation of the wearable device in the physical space, and wherein the one or more objects comprises at least one of the apparatus, a body part associated with a user of the wearable device, or an input device.

13. The apparatus of claim 1, wherein the one or more processors are configured to:

determine, based on at least one of data from the wearable device or a command from the wearable device, one or more extended reality (XR) inputs to an XR application on the apparatus.

14. The apparatus of claim 13, wherein the one or more XR inputs comprise at least one of a modification of a virtual element along multiple dimensions in space, a selection of the virtual element, a navigation event, or a request to measure a distance defined by at least one of the first position of the wearable device, the second position of the wearable device, or the movement of the wearable device.

15. The apparatus of claim 14, wherein the virtual element comprises at least one of a virtual object rendered by the apparatus, a virtual plane in an environment rendered by the apparatus, or the environment rendered by the apparatus.

16. The apparatus of claim 14, wherein the navigation event comprises at least one of scrolling rendered content or moving from a first interface element to a second interface element.

17. The apparatus of claim 1, wherein the one or more processors are configured to:
receive, from the wearable device, an input configured to trigger an adjustment of one or more XR operations at the apparatus, wherein the one or more XR operations comprise at least one of object detection, object classification, object tracking, pose estimation, or shape estimation.

18. The apparatus of claim 1, wherein the wearable device comprises a bracelet, a ring, or a glove, and wherein the position information comprises at least one of a measurement from an inertial measurement unit from one or more sensors on the wearable device or an elevation measured by a pressure sensor from the one or more sensors.

19. The apparatus of claim 1, wherein the apparatus comprises a mobile device.

20. The apparatus of claim 19, wherein the apparatus comprises a camera.

21. The apparatus of claim 19, wherein the apparatus comprises an XR device including a display.

22. A method comprising:
determining a first position of a wearable device in a physical space;
receiving, from the wearable device, position information associated with the wearable device;
determining a second position of the wearable device based on the received position information;
tracking, based on the first position and the second position, a movement of the wearable device relative to an electronic device;
determining, based on at least one of the second position of the wearable device or the movement of the wearable device, that the wearable device is outside of a field-of-view (FOV) of one or more image sensors on the electronic device and is moving towards an area within the FOV of the one or more image sensors; and
initiating, based on determining that the wearable device is outside of the FOV of the one or more image sensors and is moving towards the area within the FOV of the one or more image sensors, one or more imaging operations and one or more tracking operations at the electronic device, the one or more tracking operations being at least partly based on image data from the one or more imaging operations.

23. The method of claim 22, wherein tracking the movement of the wearable device further comprises:
determining the first position of the wearable device within a first coordinate system of the wearable device;
transforming the first coordinate system of the wearable device to a second coordinate system of the electronic device; and
determining the second position of the wearable device within the second coordinate system of the electronic device.

24. The method of claim 22, further comprising:
tracking, based on at least one of the second position of the wearable device or the movement of the wearable device, a location of a hand associated with the wearable device.

25. The method of claim 24, further comprising:
based on a determination that the wearable device is within the FOV of the one or more image sensors, capturing one or more images of the hand via at least one image sensor from the one or more image sensors; and
tracking the location of the hand further based on the one or more images of the hand, the location of the hand being tracked relative to a first coordinate system of the wearable device.

26. The method of claim 22, further comprising:
based on a first determination that the wearable device is within a first FOV of a first image sensor on the electronic device, adjusting a first setting of the first image sensor, the first setting comprising at least one of a power mode of the first image sensor and an operating state of the first image sensor; and
based on second determination that the wearable device is outside of a second FOV of a second image sensor on the electronic device, adjusting a second setting of the second image sensor, the second setting comprising at least one of a power mode of the second image sensor and an operating state of the second image sensor.

27. The method of claim 26, wherein adjusting the first setting of the first image sensor further comprises changing at least one of the power mode of the first image sensor from a first power mode to a second power mode comprising a higher power mode than the first power mode or the operating state of the first image sensor from a first operating state to a second operating state comprising a higher operating state than the first operating state, the second operating state comprising at least one of a higher framerate or a higher resolution.

28. The method of claim 26, wherein adjusting the second setting of the second image sensor further comprises changing at least one of the power mode of the second image sensor from a first power mode to a second power mode comprising a lower power mode than the first power mode or the operating state of the second image sensor from a first operating state to a second operating state comprising a lower operating state than the first operating state, the second operating state comprising at least one of a lower framerate or a lower resolution.

29. The method of claim 22, further comprising:
based on determining that the wearable device is outside of the FOV of the one or more image sensors, tracking a location of the wearable device based on additional position information from the wearable device.

30. The method of claim 22, further comprising:
in response to a determination that the wearable device is within the FOV of the one or more image sensors and a view of the one or more image sensors to the wearable device is obstructed, tracking a location of the wearable device based on additional position information from the wearable device.

31. The method of claim 30, further comprising:
in response to the determination that the wearable device is within the FOV of the one or more image sensors and the view of the one or more image sensors to the wearable device is obstructed, initializing the one or more image sensors.

32. The method of claim 22, wherein determining the first position of the wearable device further comprises:
receiving at least one of image data from one or more image sensors on the electronic device or data associated with one or more measurements from one or more sensors on the wearable device; and
determining the first position of the wearable device based on at least one of the image data from the one or more image sensors or data associated with the one or more measurements from the one or more sensors, wherein the data comprises at least one of a distance of the wearable device relative to one or more objects, a velocity of the movement of the wearable device, a touch signal measured by the one or more sensors, audio data from the one or more sensors, and an elevation of the wearable device in the physical space, and wherein the one or more objects comprise at least one of the electronic device, a body part associated with a user of the wearable device, or an input device.

33. The method of claim 22, further comprising:
determining, based on at least one of data from the wearable device or a command from the wearable device, one or more extended reality (XR) inputs to an XR application on the electronic device, wherein the one or more XR inputs comprise at least one of a modification of a virtual element along multiple dimensions in space, a selection of the virtual element, a navigation event, or a request to measure a distance defined by at least one of the first position of the wearable device, the second position of the wearable device, or the movement of the wearable device.

34. The method of claim 33, wherein the virtual element comprises at least one of a virtual object rendered by the electronic device, a virtual plane in an environment rendered by the electronic device, and the environment rendered by the electronic device, and wherein the navigation event comprises at least one of scrolling rendered content or moving from a first interface element to a second interface element.

* * * * *